United States Patent
Lee et al.

(10) Patent No.: US 9,894,369 B2
(45) Date of Patent: *Feb. 13, 2018

(54) IMAGE ENCODING AND DECODING METHOD SUPPORTING PLURALITY OF LAYERS AND APPARATUS USING SAME

(71) Applicant: KT CORPORATION, Gyeonggi-do (KR)

(72) Inventors: Bae Keun Lee, Seoul (KR); Joo Young Kim, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/908,214

(22) PCT Filed: Jul. 25, 2014

(86) PCT No.: PCT/KR2014/006792
§ 371 (c)(1),
(2) Date: Jan. 28, 2016

(87) PCT Pub. No.: WO2015/016535
PCT Pub. Date: Feb. 5, 2015

(65) Prior Publication Data
US 2016/0191928 A1    Jun. 30, 2016

(30) Foreign Application Priority Data

Jul. 30, 2013 (KR) .................. 10-2013-0090227
Jul. 30, 2013 (KR) .................. 10-2013-0090228
Nov. 14, 2013 (KR) .................. 10-2013-0138517

(51) Int. Cl.
*H04N 19/31* (2014.01)
*H04N 19/105* (2014.01)
(Continued)

(52) U.S. Cl.
CPC .......... *H04N 19/30* (2014.11); *H04N 19/463* (2014.11); *H04N 19/58* (2014.11); *H04N 19/70* (2014.11);
(Continued)

(58) Field of Classification Search
CPC ... H04N 19/30; H04N 19/000569; H04N 7/26
See application file for complete search history.

(56) References Cited

U.S. PATENT DOCUMENTS

2007/0286283 A1    12/2007   Yin et al.
2009/0003445 A1    1/2009    Ying et al.
(Continued)

FOREIGN PATENT DOCUMENTS

JP    2009-522888 A    6/2009
KR    10-2008-0037593 A    4/2008
(Continued)

OTHER PUBLICATIONS

Ohji Nakagami et al., "AHG9: On initialization process of reference picture lists for HEVC extensions", Document: JCTVC-M0081, Joint Collaborative Team on Video Coding (JCT-VC) of ITU-T SG 16 WP 3 and ISO/IEC JTC 1/SC 29/ NG 11 13th Meeting: Incheon, KR, Apr. 18-26, 2013, pp. 1-11.*

(Continued)

*Primary Examiner* — Sath V Perungavoor
*Assistant Examiner* — Patricia I Young
(74) *Attorney, Agent, or Firm* — IP Legal Services, LLC

(57) ABSTRACT

An image decoding method supporting a plurality of layers according to the present invention may comprise the steps of: when an initial reference picture list of a current picture is configured, receiving flag information indicating whether reference picture set information of a reference layer to which the current picture refers is used; generating the initial reference picture list on the basis of the flag information; and (Continued)

predicting the current picture on the basis of the initial reference picture list. Accordingly, the present invention provides a method for generating a reference picture list including a picture of a layer, which is different from a layer to be currently encoded and decoded, and an apparatus using the same.

5 Claims, 13 Drawing Sheets

(51) Int. Cl.
*H04N 19/30* (2014.01)
*H04N 19/58* (2014.01)
*H04N 19/70* (2014.01)
*H04N 19/463* (2014.01)
*H04N 19/157* (2014.01)
*H04N 19/187* (2014.01)

(52) U.S. Cl.
CPC .......... *H04N 19/105* (2014.11); *H04N 19/157* (2014.11); *H04N 19/187* (2014.11)

(56) References Cited

U.S. PATENT DOCUMENTS

| | | |
|---|---|---|
| 2009/0285300 A1 | 11/2009 | Han et al. |
| 2012/0044322 A1 | 2/2012 | Tian et al. |
| 2012/0050475 A1 | 3/2012 | Tian et al. |
| 2012/0056981 A1 | 3/2012 | Tian et al. |
| 2013/0077677 A1 | 3/2013 | Wang et al. |
| 2013/0077678 A1 | 3/2013 | Chen et al. |
| 2013/0077679 A1 | 3/2013 | Wang et al. |
| 2013/0077680 A1 | 3/2013 | Wang et al. |
| 2013/0077681 A1 | 3/2013 | Chen et al. |
| 2013/0077685 A1 | 3/2013 | Chen et al. |
| 2013/0077687 A1 | 3/2013 | Wang et al. |
| 2013/0128973 A1 | 5/2013 | Han et al. |
| 2013/0155184 A1* | 6/2013 | Chen .................. H04N 13/0048 348/43 |
| 2013/0343461 A1 | 12/2013 | Lee et al. |
| 2014/0079119 A1 | 3/2014 | Samuelsson et al. |
| 2014/0119440 A1 | 5/2014 | Lee et al. |
| 2014/0119441 A1 | 5/2014 | Lee et al. |
| 2014/0286416 A1 | 9/2014 | Jeon et al. |
| 2015/0139323 A1 | 5/2015 | Lee et al. |
| 2015/0208093 A1 | 7/2015 | Lee et al. |

FOREIGN PATENT DOCUMENTS

| | | |
|---|---|---|
| KR | 10-2009-0119434 A | 11/2009 |
| KR | 10-2013-0000334 A | 1/2013 |
| WO | 2007/080033 A1 | 7/2007 |
| WO | 2012/033327 A2 | 3/2012 |
| WO | 2013/036041 A2 | 3/2013 |
| WO | 2013/062470 A1 | 5/2013 |
| WO | 2013/066045 A1 | 5/2013 |
| WO | 2013/070028 A1 | 5/2013 |

OTHER PUBLICATIONS

Jianle Chen et al., "SHVC Working Draft 2", Document: JCTVC-M1008_v3, Joint Collaborative Team on Video coding (JCT-VC) of ITU-T SG16 WP3 and ISO/IEC JTC1/SC29/WG11 13th Meeting: Incheon, KR, Apr. 18-26, 2013, pp. 1-60.

Yongjin Cho et al., "Inter-layer reference picture set initialization", Document: JCTVC-M0150, Joint Collaborative Team on Video Coding (JCT-VC) of ITU-T SG 16 WP 3 and ISO/IEC JTC 1/SC 29/WG 11 13th Meeting: Incheon, KR, Apr. 18-26, 2013, pp. 1-2.

Kiaoyu Xiu et al., "TE A2: Inter-layer reference picture placement", Document: JCTVC-L0051, Joint Collaborative Team on Video Coding (JCT-VC) of ITU-T SG 16 WP 3 AND ISO/IEC JTC 1/SC 29/WG 11 12th Meeting: Geneva, CH, Jan. 14-23, 2013, pp. 1-8.

* cited by examiner

FIG. 4

|  |  | LTRP | LTRP | LTRP | STRP | Current Picture |
|---|---|---|---|---|---|---|
| MaxPocLsb=32 | POC | 84 ∘∘∘ | 170 ∘∘∘ | 308 ∘∘∘ | 330 | 331 |
|  | POC LSB | 20 | 10 | 20 | 10 | 11 |
|  | POC MSB | 2 | 5 | 9 | 10 | 10 |

⇓

| LTRP INDEX | LTRP[2] | LTRP[1] | LTRP[0] |
|---|---|---|---|
| POC LSB | 20 | 10 | 20 |
| delta_poc_msb_cycle_lt | 3 | 4 | 1 |
| DeltaPocMSBCycleLt | 8 | 5 | 1 |
| pocLt | 84 | 170 | 308 |

Ex : LTRP[0]
pocLt=331-1-32-11+20=308

FIG. 10

(a) | SECOND REFERENCE PICTURE SET | FIRST REFERENCE PICTURE SET | FOURTH REFERENCE PICTURE SET | THIRD REFERENCE PICTURE SET |

INITIAL REFERENCE PICTURE LIST 1

(b) | SECOND REFERENCE PICTURE SET | FOURTH REFERENCE PICTURE SET | FIRST REFERENCE PICTURE SET | THIRD REFERENCE PICTURE SET |

INITIAL REFERENCE PICTURE LIST 1

IMAGE ENCODING AND DECODING METHOD SUPPORTING PLURALITY OF LAYERS AND APPARATUS USING SAME

CROSS REFERENCE TO RELATED APPLICATIONS

This application is a National Stage Patent Application of PCT International Patent Application No. PCT/KR2014/006792 (filed on Jul. 25, 2014) under 35 U.S.C. § 371, which claims priority to Korean Patent Application Nos. 10-2013-0090227 (filed on Jul. 30, 2013), 10-2013-0090228 (filed on Jul. 30, 2013) and 10-2013-0138517 (filed on Nov. 14, 2013), the teachings of which are incorporated herein in their entireties by reference.

Technical Field

The present invention generally relates to video compression technology and, more particularly, to a method and device for performing video coding that supports a multi-layer structure.

Background Art

Recently, demand for high-resolution, high-quality video such as HD (High Definition) video and UHD (Ultra High Definition) video is increasing in various application fields. As video data has high-resolution, high-quality images, the amount of data is higher than for existing video data. Therefore, when the video data is transmitted using media such as existing wired and wireless broadband lines or is stored in existing storage media, transmission costs and storage costs increase. To solve these problems caused by the high-resolution and high-quality video data, high-efficiency video compression techniques may be used.

As video compression techniques, there are various techniques such as an inter-prediction technique for predicting the values of pixels included in a current picture from pictures that precede or follow the current picture, an intra-prediction technique for predicting the values of pixels in the current picture using information about the pixels included in the current picture, an entropy coding technique, in which the shortest code is assigned to the most frequently used value and the longest code is assigned to the least frequently used value, and the like. Video data may be effectively compressed using these video compression techniques, and may then be transmitted or stored.

DISCLOSURE

Technical Problem

An object of an embodiment of the present invention is to provide a method for generating, for a target layer to be currently encoded and decoded, a reference picture list including pictures of another layer, and a device using the method.

Another object of the embodiment of the present invention is to provide a method for generating a reference picture list using information about the reference picture set of a reference layer and a device using the method.

A further object of the embodiment of the present invention is to provide a method for generating a reference picture list using information about the position, to which a reference picture set is to be added, in an initial reference picture list, and a device using the method.

Technical Solution

A method for decoding video supporting multiple layers according to an embodiment of the present invention includes receiving flag information that indicates whether information about a reference picture set of a reference layer referred to by a current picture is used, upon constructing an initial reference picture list of the current picture; generating the initial reference picture list based on the flag information; and performing prediction of the current picture based on the initial reference picture list.

The flag information may indicate whether a short-term reference picture set and a long-term reference picture set of the reference layer are derived as a short-term reference picture set and a long-term reference picture set of the current picture.

The flag information may indicate whether a short-term reference picture set of the reference layer is derived as a short-term reference picture set of the current picture.

The flag information may indicate whether a long-term reference picture set of the reference layer is derived as a long-term reference picture set of the current picture.

The reference layer may be a base layer.

The flag information may indicate whether a position to which an inter-layer reference picture set of the reference layer is to be added in an initial reference picture list of the reference layer is used as a position to which an inter-layer reference picture set of the current picture is to be added in the initial reference picture list of the current picture.

The flag information may indicate whether an inter-layer reference picture set of the reference layer is derived as an inter-layer reference picture set of the current picture.

The flag information may be received, with the flag information being included in a sequence parameter set.

The video decoding method may further include generating a final reference picture list by modifying the initial reference picture list.

Performing prediction of the current picture may be configured to use a reference picture, included in an inter-layer reference picture set, as a reference picture of the current picture.

An apparatus for decoding video supporting multiple layers according to an embodiment of the present invention includes an entropy decoding unit for decoding information required for prediction and decoding of video received via a bitstream; and a prediction unit for generating an initial reference picture list of a current picture based on flag information that indicates whether information about a reference picture set of a reference layer referred to by the current picture is used, upon constructing the initial reference picture list of the current picture, and for performing prediction of the current picture based on the initial reference picture list.

Advantageous Effects

In accordance with an embodiment of the present invention, there are provided a method for generating, for a target layer to be currently encoded and decoded, a reference picture list including pictures of another layer, and a device using the method.

In accordance with an embodiment of the present invention, there are provided a method for generating a reference picture list using information about the reference picture set of a reference layer and a device using the method.

In accordance with an embodiment of the present invention, there are provided a method for generating a reference picture list using information about the position, to which a reference picture set is to be added, in an initial reference picture list, and a device using the method.

DESCRIPTION OF DRAWINGS

FIG. 4 is a conceptual diagram illustrating a method for deriving the Picture Order Count (POC) of long-term reference pictures;

FIG. 10 is a diagram showing the construction of reference picture list 1 according to another embodiment of the present invention;

BEST MODE

Figure 1:
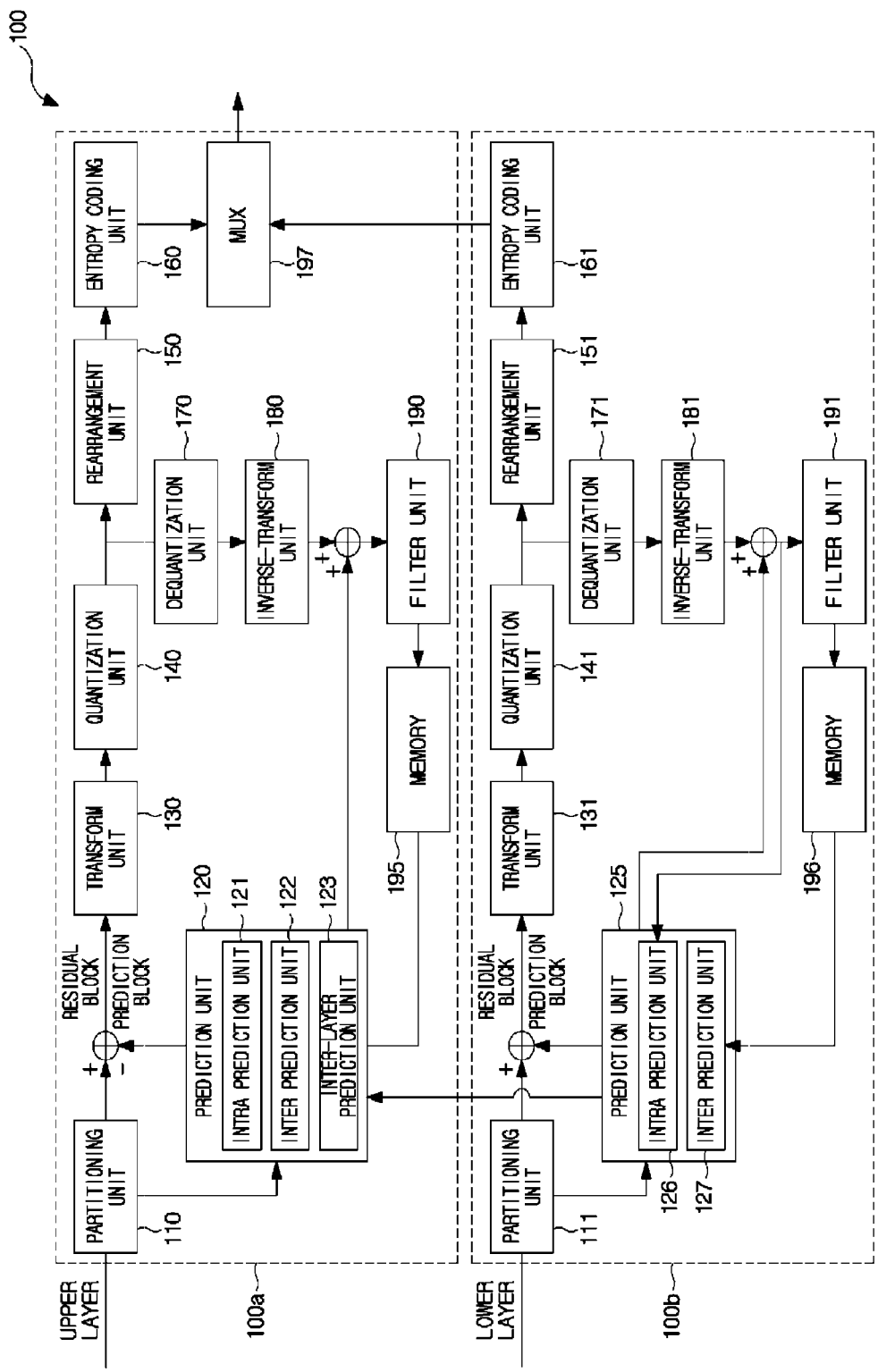
FIG. 1 is a block diagram schematically showing an encoding device according to an embodiment of the present invention.

A video decoding method for decoding video supporting multiple layers according to an embodiment of the present invention includes receiving flag information that indicates whether information about a reference picture set of a reference layer referred to by a current picture is used, upon constructing an initial reference picture list of the current picture; generating the initial reference picture list based on the flag information; and performing prediction of the current picture based on the initial reference picture list.

The flag information may indicate whether a short-term reference picture set and a long-term reference picture set of the reference layer are derived as a short-term reference picture set and a long-term reference picture set of the current picture.

The flag information may indicate whether a short-term reference picture set of the reference layer is derived as a short-term reference picture set of the current picture.

The flag information may indicate whether a long-term reference picture set of the reference layer is derived as a long-term reference picture set of the current picture.

The reference layer may be a base layer.

The flag information may indicate whether a position to which an inter-layer reference picture set of the reference layer is to be added in an initial reference picture list of the reference layer is used as a position to which an inter-layer reference picture set of the current picture is to be added in the initial reference picture list of the current picture.

The flag information may indicate whether an inter-layer reference picture set of the reference layer is derived as an inter-layer reference picture set of the current picture.

The flag information may be received, with the flag information being included in a sequence parameter set.

The video decoding method may further include generating a final reference picture list by modifying the initial reference picture list.

Performing prediction of the current picture may be configured to use a reference picture, included in an inter-layer reference picture set, as a reference picture of the current picture.

A video decoding device for decoding video supporting multiple layers according to an embodiment of the present invention includes an entropy decoding part for decoding information required for prediction and decoding of video received via a bitstream; and a prediction part for generating an initial reference picture list of a current picture based on flag information that indicates whether information about a reference picture set of a reference layer referred to by the current picture is used, upon constructing the initial reference picture list of the current picture, and for performing prediction of the current picture based on the initial reference picture list.

Mode for Invention

Element modules described in the embodiments and drawings of the present invention are independently shown in order to indicate different and characteristic functions of a video encoding device. However, this does not mean that each of the element modules is formed of a separate piece of hardware or software. That is, the element modules are arranged and included for convenience of description, and at least two of the element modules may form one element module or one element module may be divided into a plurality of element modules to perform their own functions. An embodiment in which the element modules are integrated and an embodiment in which the element modules are separated are included in the scope of the present invention, unless it departs from the essence of the present invention.

Further, some elements disclosed in the present invention are not essential elements for performing essential functions, but may be optional elements for improving only performance. The present invention may be implemented using only essential elements for implementing the essence of the present invention, without elements used merely to improve performance, and a structure including only essential elements, but not optional elements used only to improve performance, is included in the scope of the present invention.

The present invention may be variously changed and may have various embodiments, and specific embodiments will be described in detail below with reference to the attached drawings. However, it should be understood that those embodiments are not intended to limit the present invention to specific disclosure forms and they include all changes, equivalents or modifications included in the spirit and scope of the present invention. The terms used in the present specification are merely used to describe specific embodiments and are not intended to limit the present invention. A singular expression includes a plural expression unless a description to the contrary is specifically pointed out in context. In the present specification, it should be understood that the terms such as "include" or "have" are merely intended to indicate that features, numbers, steps, operations, components, parts, or combinations thereof are present, and are not intended to exclude the possibility that one or more other features, numbers, steps, operations, components, parts, or combinations thereof will be present or added.

Hereinafter, embodiments of the present invention will be described in detail with reference to the accompanying drawings. In the following description of the present invention, the same reference numerals are used to designate the same or similar components throughout the drawings and repeated descriptions of the same components will be omitted.

Video encoding and decoding that support multiple layers in a bitstream are referred to as "scalable coding". Since there is a strong correlation between multiple layers, duplicate elements in data may be removed and the encoding performance of video may be improved if prediction is performed based on such correlation. Hereinafter, predicting the current layer, which is the target of prediction, using information about another layer is referred to as "inter-layer prediction".

At least one of a resolution, a frame rate, and a color format may be different between the multiple layers, and up-sampling or down-sampling may be performed in order to adjust the resolution during the inter-layer prediction.

FIG. 1 is a block diagram schematically illustrating an encoding device according to an embodiment of the present invention.

An encoding device 100 according to the present invention includes an encoding unit 100a for an upper layer and an encoding unit 100b for a lower layer.

The upper layer may be called a current layer or an enhancement layer, and the lower layer may be called a reference layer or a base layer. At least one of the resolution, frame rate, and color format may differ between the upper layer and the lower layer. When a change of resolution is required for inter-layer prediction, up-sampling or down-sampling of the layer may be performed.

The encoding unit 100a for the upper layer may include a partitioning unit 110, a prediction unit 100, an intra-prediction unit 121, an inter-prediction unit 122, an inter-layer prediction unit 123, a transform unit 130, a quantization unit 140, a rearrangement unit 150, an entropy coding unit 160, an inverse quantization unit 170, an inverse-transform unit 180, a filter unit 190, a memory 195, and a multiplexer (MUX) 197.

The encoding unit 100b for the lower layer may include a partitioning unit 111, a prediction unit 125, an intra-prediction unit 126, an inter-prediction unit 127, a transform unit 131, a quantization unit 141, a rearrangement unit 151, an entropy coding unit 161, an inverse quantization unit 171, an inverse-transform unit 181, a filter unit 191, and a memory 196.

The encoding unit may be implemented by a video encoding method described in an embodiment of the present invention, which will be described below, but the operations of some units may not be performed in order to reduce the complexity of the encoding device or to enable fast real-time encoding. For example, rather than a method in which all intra-prediction mode methods are used to select the optimal intra-encoding method, a method in which one is selected from among a limited number of intra-prediction modes and the selected one is set as the final intra-prediction mode may be performed for real-time encoding when the prediction unit performs intra-prediction. In another example, a shape of a prediction block used for intra-prediction or inter-prediction may have a limited form.

The unit of a block processed in the encoding device may be a coding unit for performing coding, a prediction unit for performing prediction, or a transform unit for performing transformation. The coding unit, the prediction unit, and the transform unit may be represented as CU, PU, and TU, respectively.

Each of the partitioning units 110 and 111 may partition a layer picture into multiple combinations of coding blocks, prediction blocks, and transform blocks, and may partition a layer by selecting one combination of coding blocks, prediction blocks, and transform blocks based on a predetermined reference (for example, a cost function). For example, in order to partition a layer picture into coding units, a recursive tree structure such as a QuadTree structure may be used. Hereinafter, in an embodiment of the present invention, a coding block may mean not only a block for encoding but also a block for decoding.

A prediction block may be a unit for performing prediction, such as intra-prediction or inter-prediction. A block for intra-prediction may be a block having the form of a square, such as 2N×2N or N×N. As a block for inter-prediction, there are a block in the form of a square, such as 2N×2N and N×N, a block in the form of 2N×N and N×2N, obtained by bisecting a prediction block having a square form, and a block having an asymmetric form, obtained by a prediction block partitioning method using Asymmetric Motion Partitioning (AMP). The transform unit 115 may use different transform methods depending on the form of the prediction block.

Each of the prediction units 120 and 125 of the encoding units 100a and 100b may include an intra-prediction unit 121 or 126 for performing intra-prediction and an inter-prediction unit 1122 or 126 for performing inter-prediction. The prediction unit 120 of the encoding unit 100a for the upper layer further includes an inter-layer prediction unit 123, which performs prediction of the upper layer using the information about the lower layer.

Each of the prediction units 120 and 125 may determine whether to perform inter-prediction or intra-prediction of a prediction block. The processing unit on which prediction is performed may be different from the unit of the processing block for determining the prediction method. For example, when intra-prediction is performed, the prediction mode may be determined based on a prediction block, and the prediction process may be performed based on a transform block. A residual (residual block) between the generated prediction block and the original block may be input to the transform units 130 and 131. Also, the prediction mode information used for prediction, motion vector information, and the like are encoded along with the residual by the entropy coding unit 130, and then may be transmitted to the decoding device.

When a Pulse Code Modulation (PCM) encode mode is used, the original block may be encoded without performing prediction by the prediction units 120 and 125, and then may be transmitted to a decoding part.

Each of the intra-prediction units 121 and 126 may generate an intra-predicted block based on reference pixels adjacent to the current block (the prediction target block). In the intra-prediction method, the intra-prediction mode may have a directional prediction mode, which uses reference pixel information according to the prediction direction, and a non-directional mode, which does not use direction information when making the prediction. The mode for predicting luma information may be different from the mode for predicting chroma information. Intra-prediction mode information, obtained by predicting luma information, or information about the predicted luma signal may be used to predict chroma information. Meanwhile, if the reference pixels are not available, a prediction block may be generated by replacing the unavailable reference pixels with other pixels.

A prediction block may include multiple transform blocks. If the size of a prediction block is the same as the size of a transform block when performing intra-prediction, intra-prediction of the prediction block may be performed based on a left pixel, an upper-left pixel, and an upper pixel of the prediction block. However, if the prediction block includes multiple transform blocks because the size of a prediction block is different from that of a transform block when performing intra-prediction, intra-prediction may be performed based on reference pixels determined based on the transform block.

The intra-prediction method may generate a prediction block after applying a Mode-Dependent Intra Smoothing (MDIS) filter to reference pixels according to the intra-prediction mode. The type of MDIS filter applied to the reference pixels may vary. The MDIS filter, which is an additional filter applied to an intra-predicted block generated by performing intra-prediction, may be used for reducing a residual between reference pixels and the intra-predicted block, generated after performing prediction. When MDIS filtering is performed, different filtering may be performed on reference pixels and on some columns included in the intra-predicted block according to the direction of the intra-prediction mode.

Each of the inter-prediction units 122 and 127 may perform prediction by referring to the information about a block included in at least one of the picture preceding or the picture following the current picture. Each of the inter-prediction units 122 and 127 may include a reference picture interpolation unit, a motion prediction unit, and a motion compensation unit.

The reference picture interpolation unit may receive reference picture information from a memory 195 or 196 and may generate information about a pixel, which is smaller than an integer pixel, from the reference picture. For a luma pixel, a DCT-based 8-tap interpolation filter, which differently sets filter coefficients to generate information about a pixel that is smaller than an integer pixel in units of ¼ pixels, may be used. For chroma signals, a DCT-based 4-tap interpolation filter, which differently sets filter coefficients to generate information about a pixel that is smaller than an integer pixel in units of ⅛ pixels, may be used.

Each of the inter-prediction units 122 and 127 may perform motion prediction based on the reference picture interpolated by the reference picture interpolation unit. As a method for calculating a motion vector, various methods, such as a Full search-based Block Matching Algorithm (FBMA), a Three-Step Search (TSS) algorithm, and a New Three-Step Search (NTS) Algorithm, may be used. The motion vector may have a motion vector value corresponding to ½ or ¼ of the interpolated pixel. Each of the inter-prediction units 122 and 127 may perform prediction on a current block using any one of various inter-prediction methods.

As the inter-prediction method, any of various methods such as a skip method, a merge method, and a Motion Vector Prediction (MVP) method may be used.

In inter-prediction, motion information, that is, information about the index of a reference picture, a motion vector, and a residual signal, is entropy-coded and then transferred to the decoding unit. When a skip mode is applied, a residual may not be generated, transformed, quantized or transmitted.

The inter-layer prediction unit 123 performs inter-layer prediction for predicting an upper layer using information about the lower layer. The inter-layer prediction unit 123 may perform inter-layer texture prediction, inter-layer motion prediction (inter-layer inter-prediction), inter-layer syntax prediction, etc. using the texture information, intra-prediction mode information, motion information, syntax information, etc. of the lower layer.

Inter-layer texture prediction means that the texture of a reference block in the lower layer is used as the predicted value (prediction sample) of the current block in the upper layer, wherein the texture of the reference block may be scaled via up-sampling.

Such inter-layer texture prediction may include an intra Base Layer (BL) mode, in which the reconstructed value of the reference block in the lower layer is up-sampled and the up-sampled reference block is used as the prediction sample of the current block, and in which a residual value between the prediction sample and the current block is encoded, and a reference index mode, in which an up-sampled lower layer is stored in a memory and the stored lower layer is used as a reference index.

The intra-prediction of the upper layer may be performed using the intra-prediction mode information of the lower layer, wherein the intra-prediction mode of the lower layer may be referred to as a 'BL intra mode'.

Inter-layer motion prediction is also referred to as 'inter-layer inter-prediction'. According to the inter-layer motion prediction, the current block of the upper layer may be predicted using motion information of the lower layer. The motion information may include a motion vector and a reference picture index.

Further, the inter-layer prediction unit 123 may perform inter-layer syntax prediction for predicting or generating the texture of the current block using the syntax information of the lower layer. At this time, the syntax information of the lower layer used for prediction of the current block may include information on an intra-prediction mode, motion information, etc.

Furthermore, as yet another example of inter-layer prediction, inter-layer residual prediction may be performed such that the current block is predicted using a differential picture, which is generated using differential values between the up-sampled pictures of a reconstructed picture of the upper layer and a reconstructed picture of the lower layer.

Inter-layer texture prediction, inter-layer motion prediction, inter-layer syntax prediction, and inter-layer residual prediction have been described as examples of inter-layer prediction, but the inter-layer prediction applicable to the present invention is not limited to these examples.

A residual block including residual information, which is the difference between the prediction block generated by each of the prediction units 120 and 125 and the reconstructed block of the prediction block, is generated, and the residual block is input to the corresponding transform unit 130 or 131.

Each of the transform units 130 and 131 may transform the residual block using a transform method such as a Discrete Cosine Transform (DCT) or Discrete Sine Transform (DST). Whether to apply DCT or DST to transform the residual block may be determined based on the intra-prediction mode information of the prediction block used to generate the residual block and the size information of the prediction block. That is, each of the transform units 130 and 131 may use different transform methods depending on the size and the prediction method of the prediction block.

Each of the quantization units 140 and 141 may quantize values transformed in the frequency domain by the corresponding transform units 130 or 131. The quantization coefficients may change depending on the type of block or the importance of the pictures. The value calculated by the quantization unit 140 or 141 may be provided to the inverse-quantization unit 170 or 17 and the rearrangement unit 150 or 151.

Each of the rearrangement units 150 and 151 may rearrange coefficient values of the quantized residual value. The rearrangement unit 150 or 151 may change a 2D block format coefficient to a 1D vector format coefficient using a coefficient scanning method. For example, the rearrangement unit 150 or 151 may change the coefficient in a 2D block format to coefficient in a 1D vector format by scanning coefficients ranging from a DC coefficient to a high-frequency band coefficient using a zigzag scanning method. Depending on the size and on the intra-prediction mode of the transform block, a vertical scanning method for scanning 2D block format coefficients in a column direction and a horizontal scanning method for scanning 2D block format coefficients in a row direction, rather than the zigzag scanning method, may be used. That is, the determination of which one of the zigzag scanning, vertical scanning, and horizontal scanning methods is to be used may be determined depending on the size and the intra-prediction mode of the transform block.

Each of the entropy coding units 160 and 161 may perform entropy coding based on the values calculated by the rearrangement unit 150 or 151. The entropy coding may be implemented using, for example, various coding methods such as Exponential Golomb, Context-Adaptive Variable Length Coding (CAVLC), and Context-Adaptive Binary Arithmetic Coding (CABAC).

Each of the entropy coding units 160 and 161 may be provided with various types of information (such as the residual coefficient information, block type information, prediction mode information, partition unit information, prediction block information, transmission unit information, motion vector information, reference frame information, block interpolation information, and filtering information of a coding block) from the rearrangement unit 150 or 151 and the prediction unit 120 or 125, and may perform entropy coding based on the predetermined coding method. Further, the entropy coding unit 160 or 161 may perform entropy coding on the coefficients of the coding unit input from the rearrangement unit 150 or 151.

Each of the entropy coding units 160 and 161 may encode the intra-prediction mode information of the current block by binarizing the intra-prediction mode information. Each of the entropy coding units 160 and 161 may include a codeword mapping unit for performing such a binarization operation, and may perform binarization in a different manner depending on the size of the prediction block on which intra-prediction is to be performed. In the codeword mapping unit, a codeword mapping table may be adaptively generated using a binarization operation, or may be stored in advance. As another embodiment, each of the entropy coding units 160 and 161 may express current intra-prediction mode information using the codeNum mapping unit for performing codeNum mapping and the codeword mapping unit for performing codeword mapping. In the codeNum mapping unit and the codeword mapping unit, a codeNum mapping table and a codeword mapping table may be generated or stored.

Each of the inverse quantization units 170 and 171 and each of the inverse transform units 180 and 181 may inverse-quantize the values quantized by the quantization unit 140 or 141 and inverse-transform the values transformed by the transform unit 130 or 131. The residual value generated by the inverse quantization unit 170 or 171 and the inverse transform unit 180 or 181 may be combined with the prediction block predicted by the motion estimation unit, the motion compensation unit, and the intra-prediction unit, which are included in the prediction unit 120 or 125, and thus a reconstructed block may be generated.

Each of the filter units 190 and 191 may include at least one of a deblocking filter, an offset correction unit, and an Adaptive Loop Filter (ALF).

The deblocking filter may remove block distortion, generated due to the boundaries between blocks, in the reconstructed picture. Whether to perform deblocking, namely, whether to apply the deblocking filter to the current block, may be determined based on the pixels included in some rows or columns of the block. When the deblocking filter is applied to a block, a strong filter or a weak filter may be applied according to the required strength of deblocking filtering. Also, in applying the deblocking filter, when vertical filtering and horizontal filtering are performed, the vertical filtering and the horizontal filtering may be processed in parallel.

The offset correction unit may correct an offset between the picture on which deblocking is performed and the original picture in pixel units. In order to perform the offset correction on a specific picture, a method in which the pixels included in the picture are divided into a certain number of areas, the area to which an offset is to be applied is determined, and the offset is applied to the area may be used, or a method in which the offset is applied in consideration of the information about the edge of each pixel may be used.

The Adaptive Loop Filter (ALF) may perform filtering based on a value obtained by comparing the filtered reconstructed picture with the original picture. When pixels included in the picture are divided into one or more groups, a single filter to be applied to the corresponding group is determined and then filtering may be performed differentially for respective groups.

Each of the filter units 190 and 191 may be implemented using only a deblocking filter, using a deblocking filter and an ALF, or using a deblocking filter and an offset correction unit, rather than using all of a deblocking filter, an ALF, and an offset correction unit.

Each of the memories 195 and 196 may store the reconstructed block or pictures calculated by the filter unit 190 or 191, and the reconstructed block and pictures stored in the memory may be provided to the prediction unit 120 or 125 when inter-prediction is performed.

Information output from the entropy coding unit 100*b* of the lower layer and information output from the entropy coding unit 100*a* of the upper layer are multiplexed by the MUX 197, and may then be output in the form of a bitstream.

The MUX 197 may be included in the encoding unit 100*b* of the lower layer, or may be implemented as a separate device or module, unlike the encoding unit 100.

Figure 2:
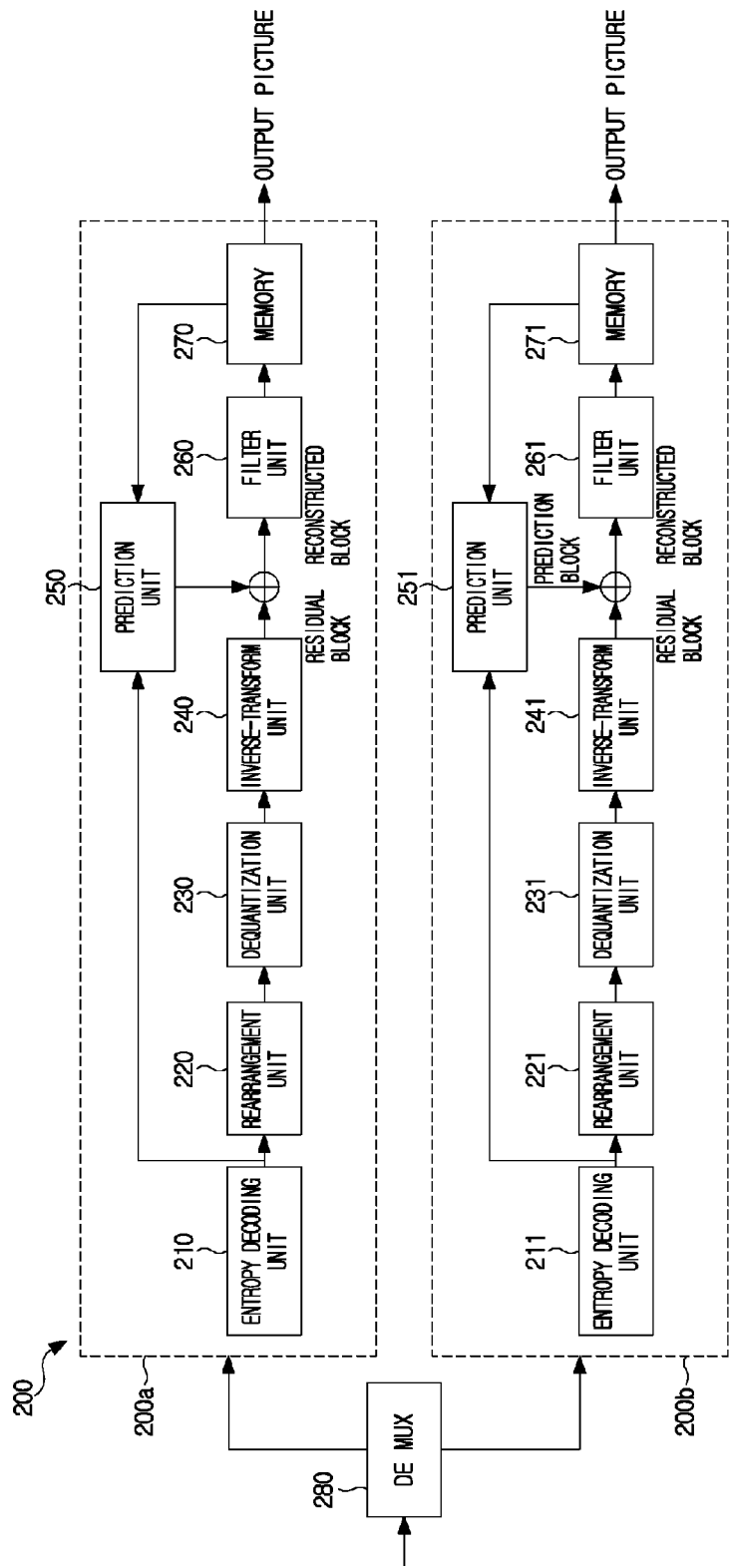
FIG. 2 is a block diagram schematically showing a decoding device according to an embodiment of the present invention.

FIG. 2 is a block diagram schematically showing a decoding device according to an embodiment of the present invention.

As shown in FIG. 2, a decoding device 200 includes a decoding unit 200*a* of an upper layer and a decoding unit 200*b* of a lower layer.

The decoding unit 200*a* of the upper layer may include an entropy decoding unit 210, a rearrangement unit 220, an inverse-quantization unit 230, an inverse-transform unit 245, a prediction unit 250, a filter unit 260, and a memory 240.

The decoding unit 200*b* of the lower layer may include an entropy decoding unit 211, a rearrangement unit 221, an inverse-quantization unit 231, an inverse-transform unit 241, a prediction unit 251, a filter unit 261, and a memory 271.

When a bitstream including multiple layers is transmitted from the encoding device, a demultiplexer (DEMUX) 280 demultiplexes the information corresponding to each of the layers and then transmits the information to the decoding unit 200*a* or 200*b* of each of the layers. The input bitstream may be decoded through a process that is the reverse of the process of the encoding device.

Each of the entropy decoding units 210 and 211 may perform entropy-decoding through the reverse of the entropy-coding process performed by the entropy coding unit of the encoding device. Among the pieces of information decoded by the entropy decoding units 210 and 211, information required to generate a prediction block is provided to the prediction units 250 and 251, and a residual value, entropy-decoded by the entropy decoding unit, may be input to the rearrangement units 220 and 221.

To perform inverse transform, each of the entropy decoding units 210 and 211 may use at least one of CABAC and CAVLC, like the entropy coding units 160 and 161.

Each of the entropy decoding units 210 and 211 may decode information about intra-prediction and inter-prediction performed by the encoding device. The entropy decoding unit includes a codeword mapping unit that has a codeword mapping table for generating an intra-prediction mode number from a received codeword. The codeword mapping table may be stored in advance, or may be generated adaptively. When a codeNum mapping table is used, a codeNum mapping unit for performing codeNum mapping may be additionally included.

Each of the rearrangement units 220 and 221 may rearrange the bitstream, entropy-decoded by the entropy decoding unit 210 or 211, based on the rearrangement method used by the encoding unit. The coefficients in one-dimensional vector form, may be rearranged by reconstructing them into coefficients in 2-dimensional block-type. The rearrangement unit receives the information about the coefficient scanning method performed by the encoding unit, and may rearrange the coefficients using a method in which inverse scanning is performed based on the sequence of scanning performed by the encoding unit.

Each of the inverse-quantization units 230 and 231 may perform inverse quantization based on the quantization parameter provided by the encoding device and the rearranged coefficients of the block.

Each of the inverse-transform units 240 and 241 may perform inverse DCT and inverse DST, which correspond to DCT and DST performed by the corresponding transform unit 130 or 131, on the result of quantization performed by the encoding device. The inverse-transform may be performed in transmission units determined by the encoding device. In the transform unit of the encoding device, DCT and DST may be selectively performed according to multiple pieces of information, such as the prediction method, the size of the current block, the prediction direction, and the like. The inverse-transform unit 225 may perform inverse transform based on the information about the transform performed by the transform unit of the encoding device. Transform may be performed based on a coding block rather than a transform block.

Each of the prediction units 250 and 251 may generate a prediction block based on information about the generation of the prediction block, provided by the entropy decoding units 210 and 211, and information about previously decoded blocks or pictures, provided from the corresponding memories 270 and 271.

Each of the prediction units 250 and 251 may include a prediction unit determination unit, an inter-prediction unit, and an intra-prediction unit.

The prediction unit determination unit receives various information, including prediction unit information input from the entropy decoding unit, prediction mode information about an intra-prediction method, motion prediction information about an inter-prediction method, and the like, separates a prediction block from a current coding block, and determines whether the prediction block performs intra-prediction or inter-prediction.

The inter-prediction unit may perform inter-prediction of the current prediction block based on information included in at least one of the pictures preceding or following the current picture, which includes the current prediction block, using information required for inter-prediction of the current prediction block provided by the encoding device. In order to perform inter-prediction, it may be determined based on the corresponding coding block whether the motion prediction method of the prediction block included in the coding block is a skip mode, a merge mode, or an AMVP mode.

The intra-prediction unit may generate a prediction block based on information about pixels in the current picture. When the prediction block is a prediction block on which intra-prediction is performed, intra-prediction may be performed based on the intra-prediction mode information about the prediction block, provided by the encoding device. The intra-prediction unit may include an MDIS filter for performing filtering on reference pixels of the current block, a reference pixel interpolation unit interpolating reference pixels for generating reference pixels in a pixel unit smaller than an integer pixel, and a DC filter for generating a prediction block through filtering when the prediction mode of the current block is a DC mode.

The prediction unit 250 of the decoding unit 200*a* of the upper layer may further include an inter-layer prediction unit for performing inter-layer prediction, in which the upper layer is predicted using information about the lower layer.

The inter-layer prediction unit may perform inter-layer texture prediction, inter-layer inter-prediction, inter-layer syntax prediction, etc. using the texture information, intra-prediction mode information, motion information, syntax information, etc. of the lower layer.

Prediction that uses the texture of a reference block in the lower layer as the predicted value of the current block in the upper layer according to the inter-layer texture prediction may be performed. The texture of the reference block may be scaled via up-sampling.

Inter-layer texture prediction includes an intra BL mode, in which the reconstructed value of the reference block in the lower layer is up-sampled and the up-sampled reference block is used as a predicted value for the current block, and in which a residual value between the predicted value and the current block is encoded, and a reference index mode, in which an up-sampled base layer is stored in the memory and the stored base layer is used as a reference index.

The intra-prediction of the upper layer may be performed using the intra-prediction mode information of the lower layer, wherein the intra-prediction mode of the lower layer may be called a 'BL intra mode'.

According to the inter-layer motion prediction, the current block of the upper layer may be predicted using the motion information of the lower layer.

Further, the inter-layer prediction unit may perform inter-layer syntax prediction for predicting or generating the texture of a current block using the syntax information of the lower layer. Here, the syntax information of the lower layer used for the prediction of the current block may include information about an intra-prediction mode, motion information, etc.

Furthermore, the inter-layer prediction unit may perform inter-layer residual prediction for predicting the current block using a differential picture that is generated using differential values between up-sampled pictures of the reconstructed picture of the upper layer and the reconstructed picture of the lower layer.

Inter-layer texture prediction, inter-layer inter-prediction, inter-layer syntax prediction, and inter-layer residual prediction have been described as examples of inter-layer prediction, but the inter-layer prediction applicable to the present invention is not limited to those examples.

The reconstructed blocks or pictures may be provided to the filter units 260 and 261. Each of the filter units 260 and 261 may include a deblocking filter, an offset correction unit, and an ALF.

The encoding device may provide information about whether a deblocking filter has been applied to the corresponding block or picture and information indicating that the applied filter is a strong filter or a weak filter when the deblocking filter is applied. The deblocking filter of the decoding device receives information about the deblocking filter provided by the encoding device, and the decoding device may perform deblocking filtering on the corresponding block.

The offset correction unit may perform offset correction on the reconstructed picture based on the type of offset correction applied to the picture during encoding and information about the offset value.

The adaptive loop filter (ALF) may perform filtering based on the value obtained by comparing the picture, reconstructed after filtering, with the original picture. The ALF may be applied to a coding unit based on information about whether to apply the ALF, information about ALF coefficients, etc., which are provided from the encoding device. Such ALF information may be provided, with the ALF information being included in a specific parameter set.

Each of the memories 270 and 271 may store the reconstructed picture or block to be used as a reference picture or a reference block, and may output the reconstructed picture.

The encoding device and decoding device may perform encoding on three or more layers rather than two layers, in which case the encoding unit of the upper layer and the decoding unit of the upper layer may include multiple encoding units and decoding units, corresponding in number to the number of upper layers.

Hereinafter, although, in the embodiments of the present invention, a coding unit has been described using the term "coding block" for the convenience of description, it may be a block on which decoding as well as encoding is performed. Below, a reference picture list generation method, which is described with reference to the drawings based on the embodiments of the present invention, may be implemented to suit the functions of respective modules described above with reference to FIGS. 1 and 2. The encoding device and the decoding device may also be included in the scope of the present invention.

As described above, in the coding of video that supports a multi-layer structure, there are a method for encoding/decoding an enhancement layer using the motion information and the texture information of a base layer and a method for encoding/decoding an enhancement layer using an up-sampled base layer as a reference picture without changing a decoding method based on the coding unit (CU) or the prediction unit (PU) of a base layer. The latter method may be referred to as a 'reference picture index (RefIdx) mode'.

When the reference picture index (RefIdx) mode is used, a picture that has been previously decoded in the enhancement layer may be used as a reference picture or, alternatively, a picture in the base layer or the lower layer may be up-sampled and then used as a reference picture.

Hereinafter, in the present invention, when a picture in the base layer or the lower layer is up-sampled and used as a reference picture, the up-sampled base layer picture or lower layer picture is referred to as an 'inter-layer reference picture'.

Even in video that supports a multi-layer structure for multiple views, inter-prediction may be performed by using a layer for another view, other than the current layer, as a reference picture. The layer for another view, which is referred to for the encoding and decoding of the corresponding layer, may also be referred to as an 'inter-layer reference picture'.

That is, when the reference picture set of the enhancement layer is configured to code video having a multi-layer structure that supports scalability, rather than a single layer, an inter-layer reference picture must also be taken into consideration.

Typically, inter-prediction may be performed such that at least one of the previous picture and the subsequent picture, relative to the current picture, is used as a reference picture, and prediction of the current block is performed based on the reference picture. A picture used for the prediction of the current block is referred to as a 'reference picture' or 'a reference frame'.

The reference picture is specified by a reference picture index (refIdx), and a predetermined region in the reference picture is specified as a reference block via a motion vector.

In inter-prediction, a prediction block for the current block may be generated by selecting a reference picture and a reference block corresponding to the current block in the reference picture.

In inter-prediction, the encoding device and the decoding device may derive the motion information of the current block, and may then perform inter-prediction and/or motion compensation based on the derived motion information. Here, the encoding device and the decoding device may improve encoding/decoding efficiency by utilizing the motion information of a reconstructed neighboring block and/or a collocated block (col block), corresponding to the current block, in a previously reconstructed collocated (col) picture.

Here, the reconstructed neighboring block is a block in the current picture that has been encoded and/or decoded and reconstructed, and may include a block adjacent to the current block and/or a block located at the external corner of the current block. Further, the encoding device and the decoding device may determine a predetermined relative location, based on the block that is present at the location spatially corresponding to the current block, in the col picture, and may derive the col block based on the determined relative position (position inside and/or outside of the block located at the position spatially corresponding to the current block). Here, for example, the col picture may correspond to one of the reference pictures included in a reference picture list.

The inter-prediction may generate a prediction block so that a residual signal between the prediction block and the current block is minimized and the size of a motion vector is also minimized.

Meanwhile, a scheme for deriving motion information may differ according to the prediction mode for the current block. The prediction mode applied for the inter-prediction may include an Advanced Motion Vector Predictor (AMVP) mode, a merge mode, etc.

For example, when the AMVP mode is applied, each of the encoding device and the decoding device may generate a motion vector candidate list using the motion vector of a reconstructed neighboring block and/or the motion vector of a col block. The motion vector of the reconstructed neighboring block and/or the motion vector of the col block may be used as motion vector candidates. The encoding device may transmit a predicted motion vector index, which indicates an optimal motion vector selected from among the motion vector candidates included in the list to the decoding device. Here, the decoding device may select a predicted motion vector of the current block from among the motion vector candidates included in the motion vector candidate list using the motion vector index.

The encoding device may obtain a Motion Vector Difference (MVD) between the motion vector of the current block and the predicted motion vector, encode the MVD, and transmit the encoded MVD to the decoding device. Here, the decoding device may decode the received MVD and derive the motion vector of the current block using the sum of the decoded MVD and the predicted motion vector.

The encoding device may also transmit a reference picture index, indicating a reference picture, or the like to the decoding device.

The decoding device may predict the motion vector of the current block using pieces of motion information of the neighboring blocks, and may derive the motion vector of the current block using a residual received from the encoding device. The decoding device may generate a prediction block for the current block based both on the derived motion vector and on the reference picture index information received from the encoding device.

As another example, when the merge mode is applied, the encoding device and the decoding device may generate a merge candidate list using both the motion information of a reconstructed neighboring block and/or the motion information of a collocated (col) block. That is, when the motion information of the reconstructed neighboring block and/or the col block is present, the encoding device and the decoding device may use the motion information as a merge candidate for the current block.

The encoding device may select a merge candidate that enables optimal encoding efficiency to be provided, from among merge candidates included in the merge candidate list, as the motion information of the current block. Here, the merge index that indicates the selected merge candidate may be transmitted to the decoding device, with the merge index being included in a bitstream. The decoding device may select one from among the merge candidates included in the merge candidate list using the transmitted merge index, and may determine the selected merge candidate to be the motion information of the current block. Therefore, when the merge mode is applied, the motion information of the reconstructed neighboring block and/or the col block may be used as the motion information of the current block without change. The decoding device may reconstruct the current block by adding the prediction block to the residual transmitted from the encoding device.

In the above-described AMVP and merge modes, in order to derive the motion information of the current block, the motion information of the reconstructed neighboring block and/or the motion information of the col block may be used.

In the skip mode, which is one of the other modes used for inter-prediction, information about a neighboring block may be used for the current block, without change. Therefore, in the skip mode, the encoding device transmits no syntax information, such as a residual, except the information indicating the block, the motion information of which is to be used as the motion information of the current block, to the decoding device.

The encoding device and the decoding device may generate the prediction block for the current block by performing motion compensation on the current block based on the derived motion information. Here, the prediction block may mean a motion-compensated block generated as the result of performing motion compensation on the current block. Further, multiple motion-compensated blocks may constitute a single motion-compensated picture.

The decoding device may check a skip flag, a merge flag, etc. received from the encoding device, and may derive motion information required for inter-prediction of the current block, for example, information about a motion vector, a reference picture index, etc., in accordance with the checked flags.

The processing unit on which prediction is performed and the processing unit on which a prediction method and detailed content are designated may differ from each other. For example, the unit of a prediction mode may be designated as a prediction block, and then prediction may be performed on a transform block basis. Alternatively, the unit of the prediction mode may be designated as a prediction block, and intra-prediction may be performed on a transform block basis.

Pictures encoded/decoded prior to the current picture are stored in memory (e.g. Decoded Picture Buffer: DPB) and may then be used for the prediction of a current block (a current picture). A list of pictures usable for the inter-prediction of the current block is maintained as a reference picture list.

P slice denotes a slice decoded via intra-prediction, or inter-prediction that uses a maximum of one motion vector and one reference picture. B slice denotes a slice decoded via intra-prediction or inter-prediction that uses a maximum of two motion vectors and two reference pictures. Here, the reference pictures include short-term reference pictures and long-term reference pictures. The pictures may be specified by a Picture Order Count (POC), indicating the sequence of indication, wherein it can be seen that short-term reference pictures are pictures, the POC of which is not greatly different from that of the current block, and the long-term reference pictures are pictures, the POC of which is greatly different from that of the current picture.

Reference picture list 0 (for the convenience of description, hereinafter referred to as 'L0') is a list of reference pictures used for inter-prediction of a P slice or a B slice. Reference picture list 1 (for the convenience of description, hereinafter referred to as 'L1') is used for the inter-prediction of a B slice. Therefore, L0 is used for inter-prediction of blocks in a P slice for performing unidirectional prediction, and L0 and L1 are used for inter-prediction of blocks in a B slice for performing bidirectional prediction.

The decoding device constructs a reference picture list when performing decoding on a P slice and a B slice via inter-prediction. Reference pictures used for inter-prediction are designated via the reference picture list. A reference picture index is an index indicating each reference picture on the reference picture list.

The reference picture list may be constructed based on reference picture sets transmitted from the encoding device.

Such a reference picture set may be composed of the POC of pictures used as reference pictures and a flag (used_by_curr_pic_s0_flag) indicating whether the corresponding picture is directly referred to. The reference pictures used to construct the reference picture list may be stored in memory (e.g. DPB). The pictures stored in the memory (pictures encoded/decoded prior to the current picture) are managed by the encoding device and the decoding device.

Figure 3:
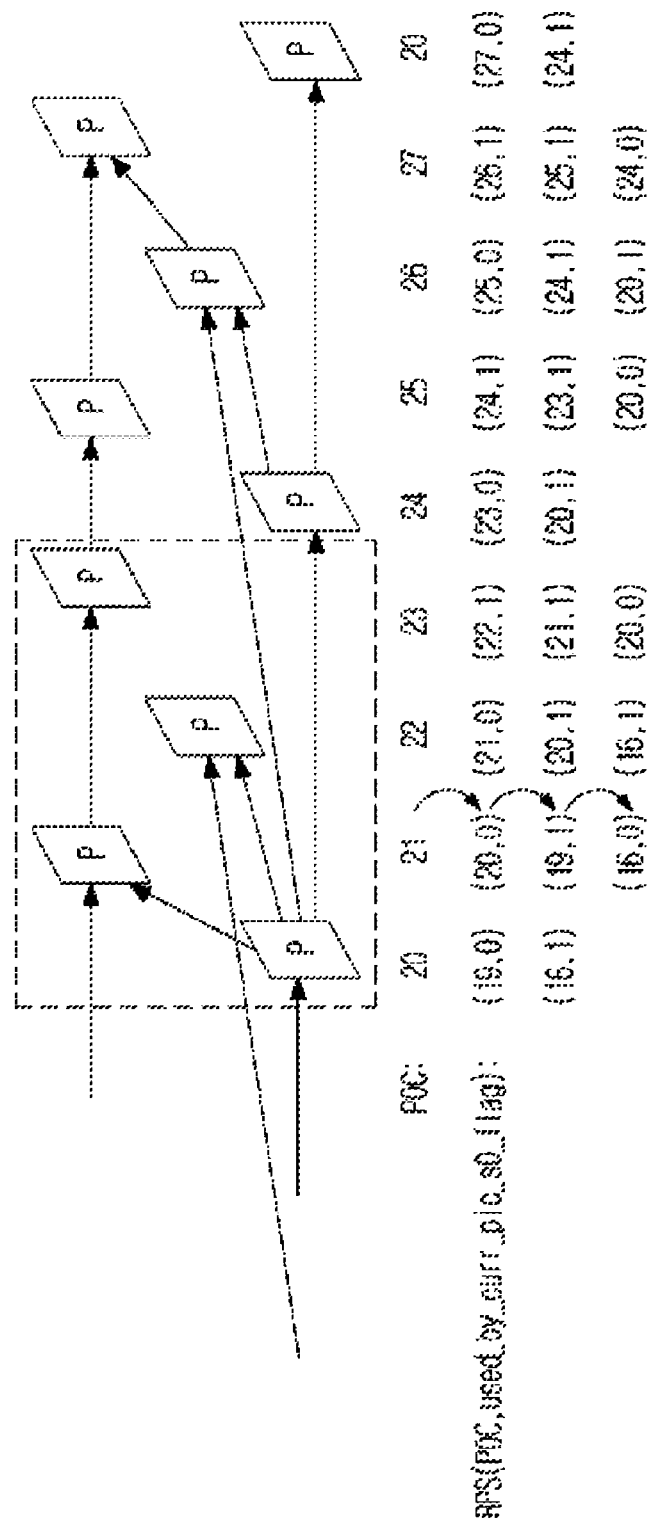
FIG. 3 is a conceptual diagram showing an example of a reference picture set that includes short-term reference pictures.

FIG. 3 is a conceptual diagram showing an example of a reference picture set that includes short-term reference pictures.

As shown in the drawing, a reference picture set (RPS) may comprise the POC of each of short-term reference pictures that must be stored in the DPB at the current time, and flag information indicating whether the current picture directly refers to a specific picture.

For example, when inter-prediction of a picture having a POC of 21 is performed, a total of three pictures (pictures having POC of 20, 19, and 16) as short-term reference pictures may be referred to, and all of the three pictures have a value of 1 as 'used_by_curr_pic_s0_flag', and thus the pictures are directly used for prediction of the picture having a POC of 21.

Meanwhile, when inter-prediction of a picture having a POC of 26 is performed, a total of three pictures (having a POC of 25, 24, and 20) as short-term reference pictures may be referred to, but the 'used_by_curr_pic_s0_flag' value of the picture having a POC of 25 is 0, unlike the 'used_by_curr_pic_s0_flag' values of the pictures having POCs of 24 and 20. In this case, the picture having a POC of 25 is not directly used for inter-prediction of the picture having a POC of 26.

Among current pictures, pictures that do not appear in the reference picture set are marked with an 'unused for reference' indicator, indicating that the pictures are not used as reference pictures, and may be deleted from the DPB.

FIG. 4 is a conceptual diagram showing a method for deriving the POC of long-term reference pictures.

As shown in the drawing, since a long-term reference picture has a POC greatly differing from that of the current picture, it may be represented using the Least Significant Bit (LSB) and the Most Significant Bit (MSB) of the POC.

'MaxPocLsb' denotes the maximum value that may be represented by LSB. When MaxPocLsb is 32, a long-term reference picture (LTRP) having a POC of 84 may be represented by 32*2+20, where LSB is 20 and MSB is 2.

The current picture having a POC of 338 may be represented by 32*10+11 when the maximum value that may be represented by LSB is 32, and thus 10 is the value of MSB and 11 is the value of LSB.

'delta_poc_msb_cycle_lt' denotes the value required to determine 'DeltaPocMsbCycleLt' that is the MSB of POC in the long-term reference picture set of the current picture. 'DeltaPocMsbCycleLt' may correspond to the difference between the MSB of the POC of the current picture and the MSB of the POC of the reference picture.

In the case of the long-term reference picture, the POC of the reference picture may be derived using the LSB value of the POC of the reference picture and the difference between the MSB of the POC of the current picture and the MSB of the POC of the reference picture.

For example, when the POC of the current picture is 331, a long-term reference picture (LTRP[0]) having a POC of 308 and indexed with '0' may be represented by 331−1*32−11+20 if both the LSB value of 20 of the long-term reference picture and the difference of 1 between the MSB of the POC of the current picture and the MSB of the POC of the reference picture are used.

Similarly, the long-term reference picture (LTRP[1]) that is indexed with '1' and has a POC of 170 may be represented by 331−5*32−11+10 if both the LSB of 10 of the long-term reference picture and the difference of 5 between the MSB of the POC of the current picture and the MSB of the POC of the reference picture are used.

As shown in FIGS. 3 and 4, an initial reference picture list that can be referred to by the current picture may be constructed using the list of pictures present in the short-term reference picture buffer and the long-term reference picture buffer.

Figure 5:
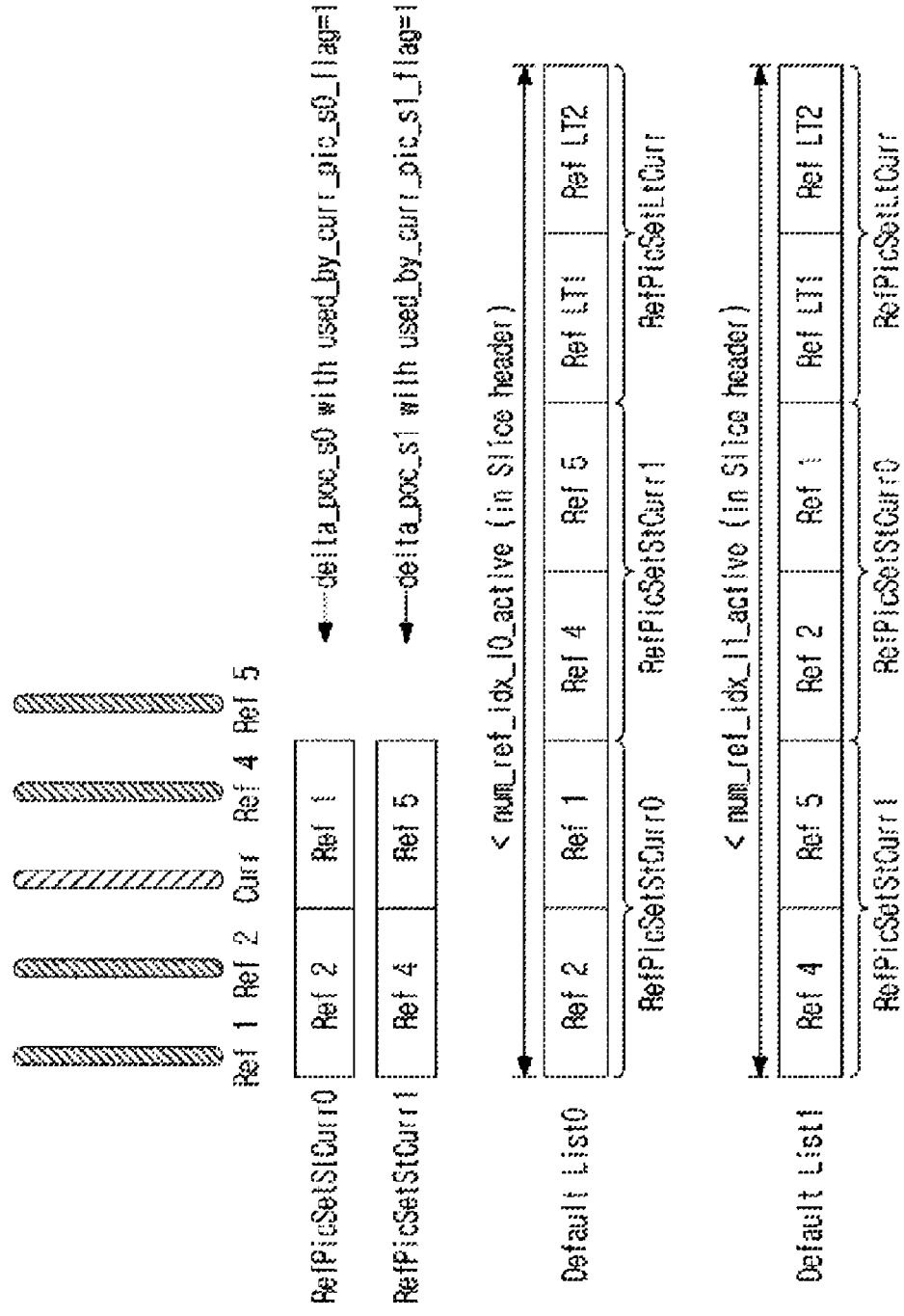
FIG. 5 is a diagram showing an example in which a reference picture list is constructed.

FIG. 5 is a diagram showing an example in which a reference picture list is constructed.

The reference pictures may be classified into a first short-term reference picture set (RefPicSetStCurr0) composed of reference pictures Ref1 and Ref2 having a POC less than that of a current picture (Curr) based on the current picture, a second short-term reference picture set (RefPicSetStCurr1) composed of reference pictures Ref3 and Ref4 having a POC greater than that of the current picture, and a long-term reference picture set (RefPicSetLtCurr) composed of long-term reference pictures Ref LT1 and Ref LT2.

In this case, the first short-term reference picture set (RefPicSetStCurr0) is composed of pictures having a flag value (used_by_curr_pic_s0_flag) of 1 (delta_poc_s0 with used_by_curr_pic_s0_flag=1), and the second short-term reference picture set (RefPicSetStCurr1) is also composed of pictures having a flag value (used_by_curr_pic_s1_flag) of 1 (delta_poc_s1 with used_by_curr_pic_s1_flag=1).

As an aggregation of reference picture sets having different properties in this way, an initial reference picture list may be constructed.

As shown in FIG. 5, reference picture list 0, that is, L0, is constructed in the sequence of the first short-term reference picture set (RefPicSetStCurr0), the second short-term reference picture set (RefPicSetStCurr1), and the long-term reference picture set (RefPicSetLtCurr).

Meanwhile, reference picture list 1, that is, L1, is constructed in the sequence of the second short-term reference picture set (RefPicSetStCurr1), the first short-term reference picture set (RefPicSetStCurr0), and the long-term reference picture set (RefPicSetLtCurr).

The number of reference pictures that may be included in the reference picture list may be determined based on the information transmitted from the encoding device. For example, after constructing the reference picture lists, the encoding device may determine the number of reference pictures to be used, and may transmit information about the number of reference pictures to be used (e.g. num_ref_idx_lX_default_active_minus1, X=0 or 1) to the decoding device as the syntax element of a sequence parameter set (SPS). The decoding device may use the number of reference pictures, which is specified as the value obtained by adding 1 to the received information (num_ref_idx_lX_default_active_minus1), as a default value in a current sequence.

Further, when desiring to designate the number of reference pictures for each picture or each slice, the encoding device may transmit separate information indicating the number of reference pictures (e.g. num_ref_idx_l1_active_minus1, X=0 or 1) via a picture parameter set (PPS), a slice header, or the like. The decoding device may use a value, specified as the value obtained by adding 1 to the received information (num_ref_idx_l1_active_minus1), as the number of reference pictures in the current picture or the current slice.

When inter-prediction is performed, motion compensation may be performed using the reference pictures specified in the reference picture list constructed as described above.

In a multi-layer structure that provides spatial scalability or multiview scalability, the reference pictures of the enhancement layer may include reference pictures in the same layer and inter-layer reference pictures.

In this case, signaling of the inter-layer reference pictures may be performed using information required to identify layers and information required to identify reference pictures. For example, if the value of nuh_layer_id, which is present in an access unit identical to the current picture in an i-th layer and which is a j-th layer identifier (where i>j) transmitted with the layer identifier being included in the Network Abstraction Layer (NAL) unit header, is identical to the RefPiclayerId of the current picture, the corresponding picture may be determined to be used as the reference picture for the current picture. The inter-layer reference pictures may be indicated by long-term reference pictures.

'RefPicLayerId' denotes a value that can be signaled with the syntax element inter_layer_pred_layer_idc included in a slice header, and means a layer referred to by the current layer for inter-layer prediction.

Figure 6:
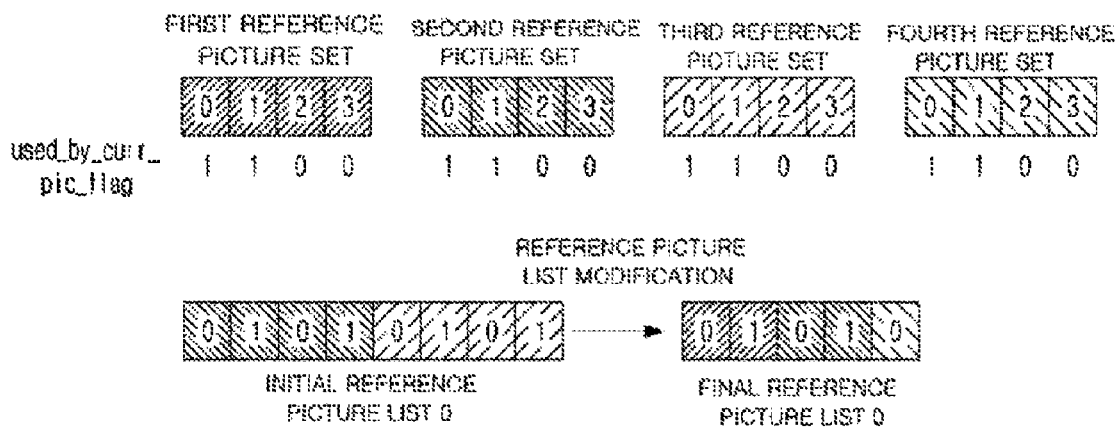
FIG. 6 is a conceptual diagram showing an example in which an inter-layer reference picture list is constructed according to an embodiment of the present invention.

FIG. 6 is a conceptual diagram showing an example in which an inter-layer reference picture list is constructed according to an embodiment of the present invention.

As shown in FIG. 6, in video having a multi-layer structure, an initial reference picture list may be constructed using a short-term reference picture set (RefPicSetStCurrBefore[i], hereinafter referred to as a 'first reference picture set') composed of short-term reference pictures having POCs less than that of a current picture, a short-term reference picture set (RefPicSetStCurr After[i], hereinafter referred to as a 'second reference picture set') composed of short-term reference pictures having POCs greater than that of the current picture, a long-term reference picture set (RefPicSetLtCurr[i], hereinafter referred to as a 'third reference picture set'), and an inter-layer reference picture set (RefPicSetILCurr[i], hereinafter referred to as a 'fourth reference picture set').

The reference pictures included in the fourth reference picture set may be the pictures of a layer supporting spatial scalability, pictures included in a layer supporting multiview scalability, or pictures of a layer supporting depth scalability or video quality scalability. Here, the spatial scalability and video quality scalability may be coded in the same codec structure.

When a bitstream supports two or more scalability types, reference pictures for respective scalability types may be integrated into a single reference picture set. When a single reference picture set is configured for multiple scalability types, information about the sequence of the scalability types aligned in the reference picture set may be transmitted from the encoding device to the decoding device.

Meanwhile, reference pictures sets may be individually configured for multiple scalability types. That is, for a current picture, a fourth reference picture set, a fifth reference picture set, and a sixth reference picture set, each composed of inter-layer reference pictures, may be generated in addition to a first reference picture set, a second reference picture set, and a third reference picture set. Such an inter-layer reference picture set may be adaptively added to the reference picture list depending on the frequency of occurrence. For example, a reference picture set having high occurrence frequency may be allocated to the low index of the reference picture list.

The initial reference picture list of FIG. 6 is L0 in which the first reference picture set is configured in the lowest sequential position of the list. At this time, the fourth reference picture set may be added to the last sequential position of the initial reference picture list L0.

The initial reference picture list 0 is constructed using pictures having flag information (used_by_curr_pic_flag) of 1 among the reference pictures included in the respective reference picture sets, wherein the flag information indicates whether the corresponding picture is currently used as the reference picture. As shown in the drawing, the initial reference picture list 0 may be constructed using only first and second pictures among four pictures included in each reference picture set.

The initial reference picture list may be modified for each picture or each slice, and reference pictures may be changed based on the modification. The initial reference picture list may be modified using syntax elements included in a slice header (e.g. ref_pic_list_modification_flag_l0, list_entry_l0, ref_pic_list_modification_flag_l1, list_entry_l1).

The ref_pic_list_modification_flag_l0 and ref_pic_list_modification_flag_l1 may explicitly indicate whether reference pictures are transmitted from the encoding device to the decoding device, in the reference picture list 0 and the reference picture list 1. When the flag value is 1, the reference picture list is explicitly specified using information about transmitted reference pictures, whereas when the flag value is 0, the reference picture list is implicitly derived as the initial reference picture set.

When the flag value is 1, list_entry_l0 denotes information about detailed entries, that is, the index of reference pictures, constituting a reference picture list for L0, and list_entry_l1 denotes information about detailed entries constituting a reference picture list for L1.

By means of this modification, final reference picture list 0 may be constructed using first and second reference pictures (0, 1) of the first reference picture set, first and second reference pictures (0, 1) of the second reference picture set, and the first reference picture (0) of the fourth reference picture set.

In accordance with another example of the present invention, upon constructing the reference picture list, the fourth reference picture set for the inter-layer reference picture may be arranged at a sequential position other than the last sequential position in the list of FIG. 6. In the multi-layer structure, a strong correlation is present between the enhancement layer and the base layer due to the characteristics of video, and thus there may frequently occur the case where inter-layer reference pictures are referred to. When an inter-layer reference picture having a high occurrence frequency is added to the position other than the last position of the reference picture list, the encoding performance of the reference picture list may be improved.

In consideration of this fact, an inter-layer reference picture may be added to various positions of a reference picture list. FIGS. 7 to 10 are conceptual diagrams showing examples in which an inter-layer reference picture list is constructed according to embodiments of the present invention.

Figure 7:
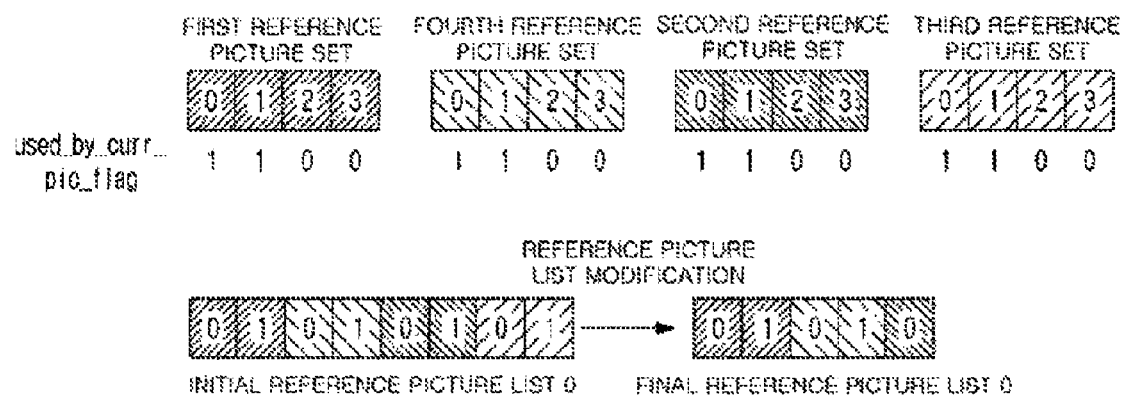
FIG. 7 is a diagram showing the construction of reference picture list 0 according to an embodiment of the present invention.

FIG. 7 illustrates the configuration of reference picture list 0 according to an embodiment of the present invention, wherein the configuration of reference picture list 0 is illustrated. As illustrated in the drawing, a fourth reference picture set that is an inter-layer reference picture set may be aligned at the second sequential position of a reference picture list.

Reference picture list 0 is constructed in the sequence of a first reference picture set, a fourth reference picture set, a second reference picture set, and a third reference picture set.

Reference picture list 0 is composed of pictures having flag information (used_by_curr_pic_flag) of 1, among reference pictures included in respective reference picture sets, wherein the flag information indicates whether the corresponding pictures are currently used as reference pictures. As shown in the drawing, initial reference picture list 0 may be constructed using only first and second pictures of four pictures in each of the reference picture sets.

The initial reference picture list constructed in this way may be modified for each picture or slice, and the entries of reference pictures may be changed according to the modification.

By means of this modification, final reference picture list 0 may be constructed using first and second reference pictures (0, 1) of the first reference picture set, first and second reference pictures (0, 1) of the fourth reference picture set, and the first reference picture (0) of the second reference picture set.

Figures 8, 9:
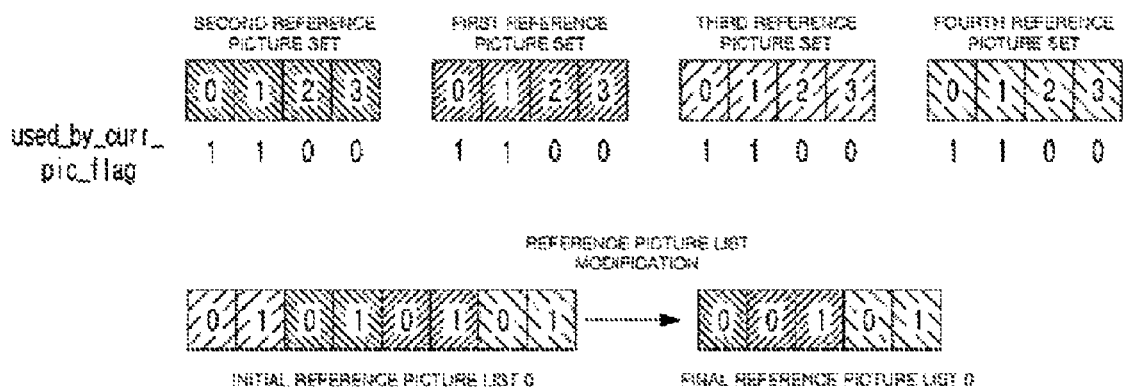
FIG. 8 is a diagram showing the construction of reference picture list 0 according to another embodiment of the present invention.
FIG. 9 is a diagram showing the construction of reference picture list 1 according to an embodiment of the present invention.

FIG. 8 is a diagram showing the configuration of reference picture list 0 according to another embodiment of the present invention.

As shown in FIG. 8 <a>, reference picture list 0 may be constructed in the sequence of a first reference picture set composed of short-term reference pictures having POCs less than that of a current picture, a second reference picture set composed of short-term reference pictures having POCs greater than that of the current picture, a fourth reference picture set composed of inter-layer reference pictures, and a third reference picture set composed of long-term reference pictures.

Alternatively, as shown in FIG. 8 <b>, reference picture list 0 is constructed such that the fourth reference picture set composed of inter-layer reference pictures is arranged at a first sequential position, and then the first reference picture set composed of short-term reference pictures having POCs less than that of the current picture, the second reference picture set composed of short-term reference pictures having POCs greater than that of the current picture, and the third reference picture set composed of long-term reference pictures are sequentially arranged.

In <b>, there is an advantage in that, when the frequency at which inter-layer reference pictures are referred to is high, the encoding and decoding efficiency of the reference picture list may be improved.

Alternatively, in a further embodiment, similar to the generation of the reference picture list of a single layer, the reference picture list may be constructed in the sequence of a first reference picture set composed of short-term reference pictures having POCs less than that of the current picture, a second reference picture set composed of short-term reference pictures having POCs greater than that of the current picture, and a third reference picture set composed of long-term reference pictures, and thereafter the positions to which inter-layer reference pictures are to be added may be specified at a slice or sequence level, that is, in a slice header or sequence parameter header.

The inter-layer reference pictures may be added to the specified positions, and then the reference picture list may be constructed. Such signaling information may be encoded with the signaling information being included in the slice header, sequence header or video parameter set, and may be transmitted to the decoding device.

FIG. 9 illustrates the construction of reference picture list 1 according to an embodiment of the present invention. As shown in the drawing, a fourth reference picture set that is an inter-layer reference picture set may be aligned at the last sequential position of the reference picture list.

Reference picture list 1 is constructed in the sequence of a second reference picture set, a first reference picture set, a third reference picture set, and the fourth reference picture set.

Reference picture list 1 is constructed using pictures having flag information (used_by_curr_pic_flag) of 1, among reference pictures included in respective reference picture sets, wherein the flag information indicates whether the corresponding pictures are currently used as reference pictures. As shown in the drawing, initial reference picture list 1 may be constructed using only first and second pictures of four pictures included in each of the reference picture sets.

The initial reference picture list constructed in this way may be modified for each picture or slice, and the entries of the reference pictures may be changed according to the modification.

By means of this modification, final reference picture list 1 may be constructed using the first reference picture (0) of the second reference picture set, the first and second reference pictures (0, 1) of the first reference picture set, and the first and second reference pictures (0, 1) of the fourth reference picture set.

FIG. 10 is a diagram showing the configuration of reference picture list 1 according to another embodiment of the present invention.

As shown in FIG. 10 <a>, reference picture list 1 may be constructed in the sequence of a second reference picture set composed of short-term reference pictures having POCs greater than that of a current picture, a first reference picture set composed of short-term reference pictures having POCs less than that of the current picture, a fourth reference picture set composed of inter-layer reference pictures, and a third reference picture set composed of long-term reference pictures.

Alternatively, as shown in FIG. 10 <b>, reference picture list 1 may be constructed such that the second reference picture set composed of short-term reference pictures having POCs greater than that of the current picture is allocated to a first sequential position, and the fourth reference picture set composed of inter-layer reference pictures is allocated to a second sequential position. Then, the reference picture list 1 may be constructed in the sequence of the first reference picture set composed of short-term reference pictures having POCs less than that of the current picture, and the third reference picture set composed of long-term reference pictures.

Alternatively, similar to the generation of the reference picture list of a single layer, the reference picture list may be constructed in the sequence of the second first reference picture set composed of short-term reference pictures having POCs greater than that of the current picture, the first reference picture set composed of short-term reference pictures having POCs less than that of the current picture, and the third reference picture set composed of long-term reference pictures, and then positions to which inter-layer reference pictures are to be added may be specified at a slice or sequence level, that is, in a slice header or sequence parameter header.

The inter-layer reference pictures may be added to the specified positions, and then the reference picture list may be constructed. Such signaling information may be encoded with the signaling information being included in the slice header, sequence header or video parameter set, and may be transmitted to the decoding device.

In video supporting a multi-layer structure, when a scalability type is a multiview type, the layer for another view may be used as the reference picture of a current layer. When multiple views, that is, multiple layers, are used as reference pictures, the fourth reference picture set composed of inter-layer reference pictures may be partitioned and separately included in reference picture lists. The reference picture lists may be constructed using various methods depending on the sequence or proximity degree of views of the current layer and the layer of the reference picture.

For example, reference pictures may be partitioned and aligned upon constructing reference picture lists depending on the difference between the current view and the reference view. Alternatively, with respect to the current view, reference pictures belonging to views lower than the current view and views higher than the current view may be separated and aligned.

Figure 11:
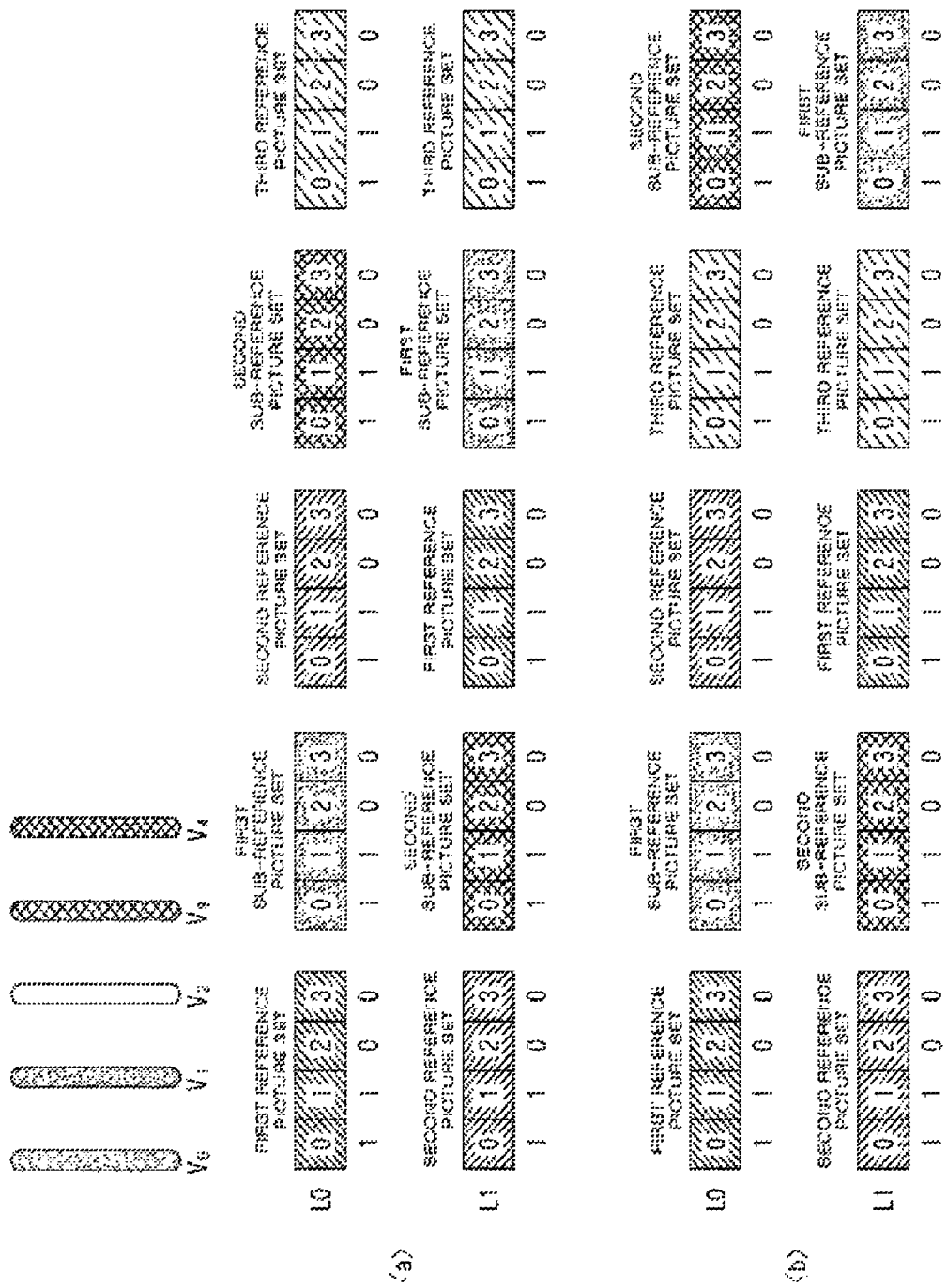
FIG. 11 is a diagram illustrating a reference picture list constructed using multiview reference pictures according to an embodiment of the present invention.

FIG. 11 illustrates a reference picture list constructed using multiview reference pictures according to an embodiment of the present invention.

As shown in the drawing, when a bitstream supports five view layers, or reference relationships are formed between the five view layers, view 2 may be assumed to be that of a current layer. With respect to the current view, view 0 and view 1 having a view sequential position lower than that of the current view may configure a single sub-reference picture set (first sub-reference picture set) or may be included in the first sub-reference picture set, and view 3 and view 4 having a view sequential position higher than that of the current view may configure a single sub-reference picture set (second sub-reference picture set), or may be included in the second sub-reference picture set.

That is, the first sub-reference layer picture set may be composed of pictures having a view sequential position lower than that of the current picture among multiview reference layer pictures, and the second sub-reference layer picture set may be composed of pictures having a view sequential position higher than that of the current picture among the multiview reference layer pictures.

As shown in <a>, reference picture list 0 may be constructed in the sequence of a first reference picture set composed of short-term reference pictures having POCs less than that of the current picture, a first sub-reference picture set, a second reference picture set composed of short-term reference pictures having POCs greater than that of the current picture, a second sub-reference picture set, and a third reference picture set composed of long-term reference pictures.

Reference picture list 1 may be constructed in the sequence of a second reference picture set composed of short-term reference pictures having POCs greater than that of the current picture, a second sub-reference picture set, a first reference picture set composed of short-term reference pictures having POCs less than that of the current picture, a first sub-reference picture set, and a third reference picture set composed of long-term reference pictures.

Alternatively, as shown in <b>, reference picture list 0 may be constructed in the sequence of a first reference picture set composed of short-term reference pictures having POCs less than that of the current picture, a first sub-reference picture set, a second reference picture set composed of short-term reference pictures having POCs greater than that of the current picture, a third reference picture set composed of long-term reference pictures, and a second sub-reference picture set. That is, the second sub-reference picture set may be added to the last sequential position of the reference picture list.

Similarly, reference picture list 1 may be constructed in the sequence of a second reference picture set composed of short-term reference pictures having POCs greater than that of the current picture, a second sub-reference picture set, a first reference picture set composed of short-term reference pictures having POCs less than that of the current picture, and a third reference picture set composed of long-term reference pictures, and a first sub-reference picture set may be added to the last sequential position of the reference picture list.

Although multiview reference pictures are included in the inter-layer reference picture of FIG. 11, the construction of the reference picture lists shown in FIG. 11 may also be applied to the case where the type of scalability is spatial scalability, and pictures in multiple layers are used as reference pictures. That is, the reference pictures may be separated and added to the reference picture lists depending on the difference between the sequences in which the current picture and the spatial layer are identified.

Figure 12:
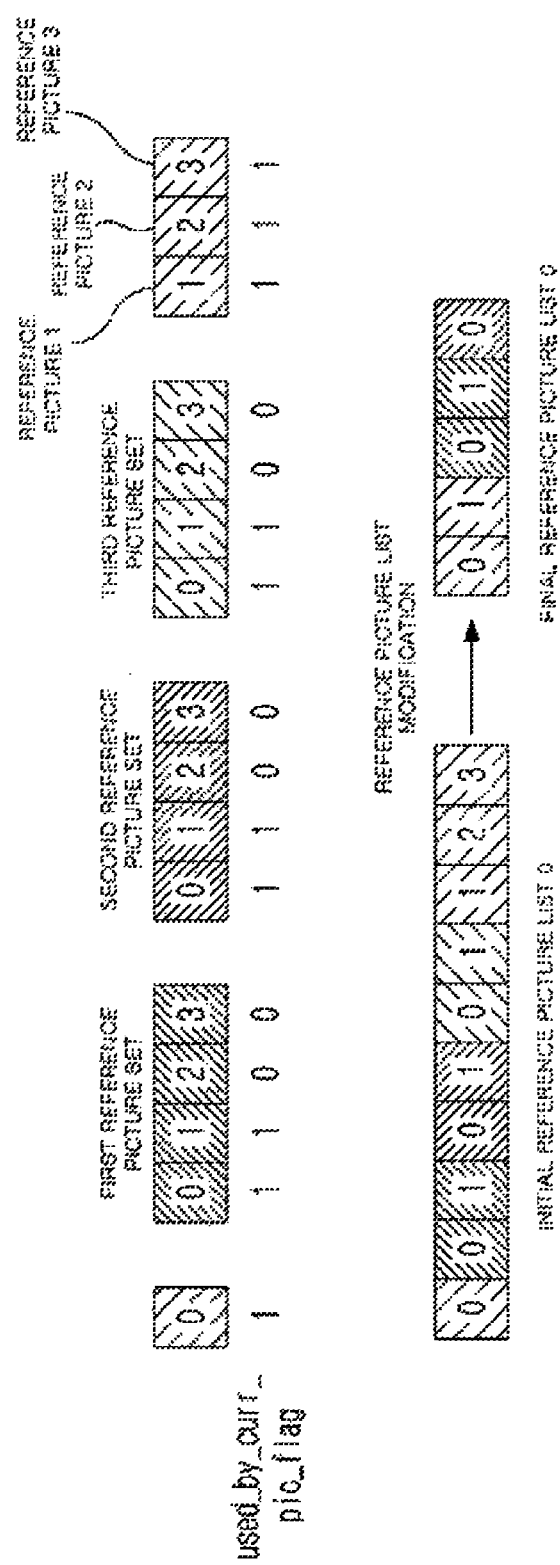
FIG. 12 illustrates a reference picture list constructed using multiview reference pictures according to another embodiment of the present invention.

FIG. 12 illustrates a reference picture list constructed using multiview reference pictures according to another embodiment of the present invention.

A layer having a smaller difference in view from the current layer has a strong possibility that pictures in the corresponding layer will be used as inter-layer reference pictures. In other words, a layer having a larger difference in view from the current layer has a weak possibility that pictures will be referred to by the current picture. In accordance with the present invention, the sequence in which reference pictures are added to the reference picture list may be adaptively modified depending on the proximity sequence in which the frequency of occurrence of the reference pictures, that is, the degree of reference between views, is taken into consideration.

That is, a lower index in a reference picture list may be allocated to a reference picture in a layer having a smaller difference in view from the current layer, and a higher index in the reference picture list may be allocated to a reference picture in a layer having a larger difference in view from the current layer.

For example, as shown in FIG. 12, among reference picture 0, reference picture 1, reference picture 2, and reference picture 3 that may be included in the multiview reference picture set, reference picture 0 may be aligned at the first sequential position of reference picture list 0, and reference picture 1, reference picture 2, and reference picture 3 may be aligned subsequent to the third reference picture set, that is, at the last sequential position of the reference picture list 0.

Here, reference picture 0 may be a reference picture in a layer having a smaller difference in view from the current layer, and reference picture 1, reference picture 2, and reference picture 3 may be pictures in a layer having a larger difference in view from the current layer.

A difference between the views of the current layer and the reference layer that may be aligned at the fore position of the reference picture list may set to a default value, or may be variably set by the encoding device and transmitted to the decoding device.

In accordance with a further embodiment of the present invention, the alignment sequence of an inter-layer reference picture set may be set according to the index (tempralId) of a temporal sub-layer for the current picture.

Figure 13:
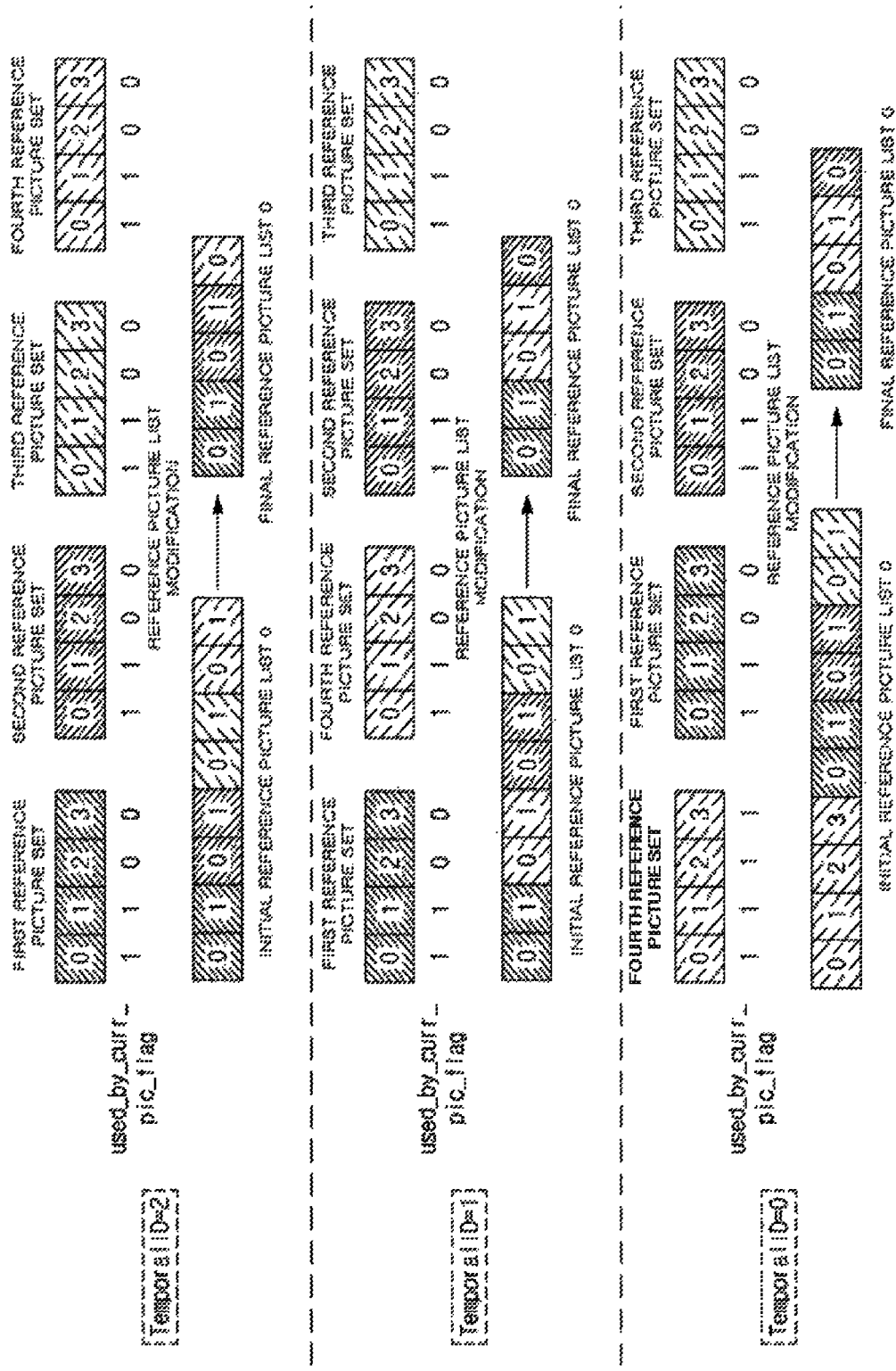
FIG. 13 illustrates a reference picture list constructed using the index of a temporal sub-layer according to an embodiment of the present invention.

FIG. 13 illustrates a reference picture list constructed using the index of a temporal sub-layer according to an embodiment of the present invention.

In a multi-layer structure, the frequency at which an inter-layer reference picture is used may differ depending on the temporal sub-layer for a current picture belonging to an enhancement layer. As temporalID that is the index value of a temporal sub-layer is larger, it may be more effective to perform inter-prediction by referring to pictures in the same layer rather than by referring to reference pictures in another layer.

In other words, when the value of tempralId is smaller, it may be more effective in coding to refer to inter-layer pictures rather than referring to pictures in the same layer. When the value of tempralId is larger, it may be more efficient in coding to use pictures in the same layer as reference pictures rather than using inter-layer pictures as reference pictures.

In the present embodiment, the positions to which inter-layer reference pictures are to be added in an initial reference picture list may be adaptively changed according to the index (tempralId) of a temporal sub-layer in consideration of the fact that the frequency at which inter-layer pictures are referred to is varied according to the temporal sub-layer.

FIG. 13 is a diagram showing the construction of reference picture list 0 when the values of tempralId range from 0 to 2.

When the value of tempralId is 0, there is a strong possibility that inter-layer prediction will be performed in the enhancement layer, and thus a fourth reference picture set composed of inter-layer reference pictures may be added to the first sequential position of an initial reference picture list.

The initial reference picture list constructed using pictures, for which flag information (used_by_curr_pic_flag) indicating whether the corresponding picture is currently used as a reference picture is 1, among reference pictures included in respective reference picture sets, is composed of four pictures (0, 1, 2, 3) included in a fourth reference picture set, and first and second pictures (0,1) of each of a first reference picture set, a second reference picture set, and a third reference picture set.

As shown in the drawing, after the initial values of the reference picture list have been set, the reference picture list is modified, and then a final reference picture list may be set. Information about the modification of the reference picture list may be signaled in a slice header.

The modified final reference picture list 0 is constructed in the sequence of first and second pictures (0,1) of the first reference picture set, first and second pictures (0,1) of the fourth reference picture set, and the first picture (0) of the second reference picture set.

When the value of tempralId is 1, the fourth reference picture set composed of inter-layer reference pictures may be added subsequent to the first reference picture set in the initial reference picture list 0.

The initial reference picture list constructed using pictures, for which flag information (used_by_curr_pic_flag) indicating whether the corresponding picture is currently used as a reference picture is 1, is composed of first and second pictures (0,1) of each of the first reference picture set, the fourth reference picture set, the second reference picture set, and the third reference picture set.

The modified final reference picture list 0 is constructed in the sequence of first and second pictures (0,1) of the first reference picture set, first and second pictures (0,1) of the fourth reference picture set, and the first picture of the second reference picture set.

When the value of tempralId is 2, there is a strong possibility that inter-prediction in the same layer will be performed rather than inter-layer prediction in an enhancement layer, and thus the fourth reference picture set composed of inter-layer reference pictures may be added subsequent to the third reference picture set, that is, at the last sequential position, in the initial reference picture list.

Initial reference picture list 0 constructed using pictures, for which flag information (used_by_curr_pic_flag) indicating whether the corresponding picture is currently used as a reference picture is 1, is composed of first and second pictures (0,1) of each of a first reference picture set, a second reference picture set, a third reference picture set, and a fourth reference picture set.

The modified final reference picture list is constructed in the sequence of first and second pictures (0,1) of the first reference picture set, the first and second pictures (0,1) of the second reference picture set, and the first picture (0) of the fourth reference picture set.

Similar to the above description, the initial reference list L1 may be configured such that the position at which the fourth reference picture set is to be added varies according to the value of temporalId. For example, when the value of temporalId is 0, initial reference list L1 may be constructed in the sequence of the fourth reference picture set, the second reference picture set, the first reference picture set, and the third reference picture set. When the value of temporalId is 1, the initial reference list L1may be constructed in the sequence of the second reference picture set, the fourth reference picture set, the first reference picture set, and the third reference picture set. When the value of temporalId is as large as 2, the fourth reference picture set may be added to the last sequential position of the initial reference picture list L1.

In summary, as shown in FIG. 13, the position, to which inter-layer reference pictures are to be added, in the initial reference picture list, may be adaptively changed according to the value of temporalId in the temporal sub-layer.

Meanwhile, according to yet another embodiment of the present invention, the sequence of construction of reference picture lists in a multi-layer structure may be differently set according to the difference between the values of layer index temporalId of temporal sub-layers of layers.

In a multi-layer structure, when the values of temporalId of the enhancement layer and the base layer are different from each other or when the difference between the values of temporalId is large, the possibility that the enhancement layer will refer to the base layer, that is, the possibility that an inter-layer reference relationship will be present, is reduced.

In contrast, when the values of temporalId of the enhancement layer and the base layer are identical to each other, or when the difference between the values of temporalId is small, the possibility that the enhancement layer will refer to the base layer, that is, the possibility that an inter-layer reference relationship will be present is increased.

Since the frequency at which inter-layer reference occurs varies according to the difference between the values of temporalId of the enhancement layer and the base layer, the positions to which inter-layer reference pictures are to be added in the reference picture list may be adaptively changed according to the difference between the values of temporalId of the layers.

For example, when the value of temporalId of a picture belonging to the enhancement layer is identical to the value of temporalId of a picture belonging to the base layer or the reference layer, an inter-layer reference picture set may be added to the first sequential position of a reference picture list, whereas when the values of temporalId of the pictures belonging to the two layers are different from each other, the inter-layer reference picture set may be added to the position subsequent to a long-term reference picture set, that is, the last sequential position of the reference picture list.

Alternatively, when the inter-layer reference picture set is added to a reference picture list, if the difference between the value of temporalId of a picture belonging to the enhancement layer and the value of temporalId of a picture belonging to the base layer or the reference layer is less than a specific value, the inter-layer reference picture set may be added to the first sequential position of the reference picture list, whereas if the difference between the values of temporalId belonging to the two layers is greater than the specific value, the inter-layer reference picture set may be added to the position subsequent to a long-term reference picture set, that is, the last sequential position of the reference picture list.

Alternatively, when the inter-layer reference picture is added to the fore position of the reference picture list, it may be added to the position of a second reference picture set in the reference picture list, rather than the position of the first reference picture set therein. When the inter-layer reference picture is added to the latter position of the reference picture list, it may be added to the position prior to a long-term reference picture set, rather than the last position of the reference picture list.

For example, when the values of temporalId of the current picture of the enhancement layer and the picture of the base layer, used as an inter-layer reference picture, have the same value, for example, 2, the inter-layer reference picture may be added to the first position of the reference picture list.

In contrast, when the value of temporalId of the current picture of the enhancement layer is 4, and the value of temporalId of the picture of the base layer, used as the inter-layer reference picture, is 2, the inter-layer reference picture may be added to the position subsequent to the long-term reference picture set in the reference picture list.

According to still another embodiment of the present invention, the reference picture list may be adaptively constructed according to the maximum number of temporal sub-layers in which inter-layer prediction is permitted.

A bitstream supporting a multi-layer structure may include information about the maximum number of temporal sub-layers to which inter-layer prediction is permitted. Such information may be transmitted as the syntax element of max_tid_il_ref_pics_plus1, which is included in a video parameter set. A value obtained by subtracting 1 from max_tid_il_ref_pics_plus 1 means the maximum number of temporal sub-layers to which inter-layer prediction is permitted. In this case, when the reference picture list is constructed, if the value of temporalId of the current layer is greater than the value, specified as the value obtained by subtracting 1 from max_tid_il_ref_pics_plus1, it is more profitable to use, as reference pictures, pictures in the same layer, rather than using up-sampled base layer pictures, from the standpoint of encoding and decoding efficiency. Therefore, when the value of temporalId of the current layer is greater than the value, specified as max_tid_il_ref_pics_plus1−1, the reference picture list may be set such that inter-layer reference is not used. In this case, an inter-layer reference picture set may not be added to the reference picture list. Even if the inter-layer reference picture set has been added, a separate signal that prevents the inter-layer reference picture set from being referred to may be signaled.

In contrast, when the value of temporalId of the current layer is less than or equal to the value, specified as max_tid_il_ref_pics_plus1, a reference picture list may be constructed by combining a short-term reference picture set, a long-term reference picture set, and an inter-layer reference picture set for the current layer. In this case, the reference picture sets may be configured in accordance with the embodiments that have been described with reference to FIGS. 6 to 13, and embodiments that may be modified from the embodiments.

Meanwhile, among the lower layers of the current layer, a lower layer, the value of temporalId of which is greater than the value, obtained by subtracting 1 from max_tid_il_ref_pics_plus1, is not referred to when prediction of the current layer is performed.

Further, in inter-prediction, since a slice or a picture, for which the value of termporalId of a temporal sub-layer is greater than that of the current slice or picture is not referred to, the slice or picture of the base layer having a value of termporalId greater than that of termporalId of the current slice or picture may not be referred to.

When an inter-layer reference picture set is not used according to the temporalId of the temporal sub-layer, only a short-term reference picture set and a long-term reference picture set for the current layer may be used to construct a reference picture list.

Meanwhile, pictures of an enhancement layer and a base layer in a bitstream supporting spatial scalability, or a picture of a current layer and a picture of a neighboring layer in a view adjacent to the current layer in a bitstream supporting multiview scalability have similar characteristics. In this case, similarity may be present between reference picture sets.

Hereinafter, a configuration will be described in which, based on the fact that reference picture sets may be similar to each other in different layers, a reference picture set or a reference picture list of a base layer or a lower layer is used when a reference picture set or a reference picture list of an enhancement layer is constructed.

According to an embodiment of the present invention, prediction of an enhancement layer may be performed by using information about the reference picture set of the base layer as the reference picture set of the enhancement layer.

That is, in the encoding device and the decoding device, a reference picture set of a base layer, another lower layer, or a layer adjacent to a current layer to be encoded or decoded (hereinafter referred to as a 'reference layer') may be used in the current layer without change.

The encoding device and the decoding device may obtain, from an encoding unit and a decoding unit for encoding and decoding the reference layer, information about the reference picture set of the reference layer, that is, information about reference pictures constituting the reference picture set and flag information indicating whether the reference pictures are currently used, and may use the obtained information to predict the enhancement layer, that is, the current layer, without change.

When the reference layer, which an enhancement layer to be currently encoded or decoded will refer to, is the picture of the base layer, the base layer may use information about a short-term reference picture set and a long-term reference picture set because there is no inter-layer reference picture. When the reference picture set of the base layer is used for the enhancement layer, signaling of this information may be performed via a sequence parameter set (SPS).

The following Table 1 shows an SPS according to an embodiment of the present invention.

TABLE 1

| seq_parameter_set_rbsp( ) { | Descriptor |
|---|---|
| ... | |
| inter_layer_copy_flag | u(1) |
| if(!inter_layer_copy_flag){ | |
| num_short_term_ref_pic_sets | ue(v) |
| for(i=0; i < num_short_term_ref_pic_sets; i++) | |
| short_term_ref_pic_set(i) | |
| long_term_ref_pics_present_flag | u(1) |
| if(long_term_ref_pics_present_flag) { | |
| num_long_term_ref_pics_sps | ue(v) |
| for(i=0; i < num_long_term_ref_pics_sps; i++ ){ | |
| lt_ref_pic_poc_lsb_sps[i] | u(v) |
| used_by_curr_pic_lt_sps_flag[i] | u(1) |
| } | |
| } | |
| } | |
| } | |
| ... | |

Referring to Table 1, the case where the value of inter_layer_copy_flag is 1 means that the short-term reference picture set and the long-term reference picture set of the reference layer, which is referred to by the current layer, are used as the short-term reference picture set and the long-term reference picture set of the current layer. When the value of inter_layer_copy_flag is 0, the slice header of the current layer, not the reference layer, is decoded, and thus the short-term reference picture set and the long-term reference picture set of the current layer are derived.

As shown in Table 1, inter_layer_copy_flag information may be transmitted, with the information being included in the SPS. Alternatively, such flag information may be transmitted, with the information being included in a picture level or a slice level.

'num_short_term_ref_pic_sets' denotes the number of short-term reference picture sets included in the SPS. As shown in Table 1, 'num_short_term_ref_pic_sets' is received when inter_layer_copy_flag is '0'.

When num_short_term_ref_pic_sets is signaled, the index of the short-term reference picture sets (short_term_ref_pic_set(i)) is derived while 'for statement (i=0; i< num_short_term_ref_pic_sets; i++))' is repeated a number of times corresponding to the number of short-term reference picture sets specified by num_short_term_ref_pic_sets.

The case where long_term_ref_pics_present_flag is 0 means that long-term reference pictures, used for prediction of pictures of the current layer, are not present, and the case where long_term_ref_pics_present_flag is 1 means that at least one long-term reference picture is used for prediction of pictures of the current layer.

'num_long_term_ref_pics_sps' denotes the number of long-term reference picture sets included in the SPS.

'lt_ref_pic_poc_lsb_sps[i]' denotes MaxPocLsb of an i-th candidate long-term reference picture specified in the SPS.

The case where used_by_curr_pic_lt_sps_flag[i] is 0 means that an i-th candidate long-term reference picture specified in the SPS is not used as the reference picture of a picture for which the i-th candidate long-term reference picture is included in the corresponding long-term reference picture set.

In summary, in an accordance with an embodiment of the present invention, when the reference layer referred to by the current layer is the base layer, the short-term reference picture set and the long-term reference picture set of the base layer may be used without change when the reference picture list of the current layer is constructed. In this case, flag information, such as inter_layer_copy_flag, may be signaled, with the flag information being included in the SPS.

According to another embodiment of the present invention, the encoding device and the decoding device may use some of reference picture sets of the reference layer as the reference picture set of the current layer. That is, when at least one of the short-term reference picture set and the long-term reference picture set of the reference layer is used as the reference picture set of the current layer, whether to use each reference picture set may be signaled.

Table 2 illustrates an SPS according to an embodiment of the present invention.

TABLE 2

| seq_parameter_set_rbsp( ){ | Descriptor |
|---|---|
| ... | |
| inter_layer_short_copy_flag | u(1) |
| if(!inter_layer_short_copy_flag){ | |
| num_short_term_ref_pic_sets | ue(v) |
| for(i=0; i < num_short_term_ref_pic_sets; i++) | |
| short_term_ref_pic_set(i) | |
| } | |
| long_term _ref_pics_present_flag | u(1) |
| inter_layer_long_copy_flag | u(1) |
| if(!inter_layer_long_copy_flag){ | |
| if(long_term_ref_pics_present_flag){ | |
| num_long_term_ref_pics_sps | ue(v) |
| for(i=0; i < num_long_term_ref_pics_sps; i++ ){ | |
| lt_ref_pic_poc_lsb_sps[i] | u(1) |
| used_by_curr_pic_lt_sps_flag[i] | u(1) |
| } | |
| } | |
| } | |
| ... | |

Referring to Table 2, the case where the value of inter_layer_short_copy_flag is 1 means that the short-term reference picture set of the reference layer referred to by the current layer is used as the short-term reference picture set of the current layer. When the value of inter_layer_short_copy_flag is 0, the short-term reference picture set of the current layer is derived by decoding the slice header of the current layer, not the reference layer.

As shown in Table 2, information about inter_layer_short_copy_flag may be transmitted, with the information being included in the SPS. Alternatively, the flag information may be transmitted, with the flag information being included in a picture level or a slice level.

'num_short_term_ref_pic_sets' denotes the number of short-term reference picture sets included in the SPS. As shown in Table 2, num_short_term_ref_pic_sets is received when inter_layer_short_copy_flag is 0.

When num_short_term_ref_pic_sets is signaled, the index of the short-term reference picture sets (short_term_ref_pic_set(i)) is derived while 'for statement (i=0; i<num_short_term_ref_pic_sets; i++))' is repeated a number of times corresponding to the number of short-term reference picture sets specified by num_short_term_ref_pic_sets.

The case where long_term_ref_pics_present_flag is 0 means that long-term reference pictures used for prediction of pictures of the current layer are not present, and the case where long_term_ref_pics_present_flag is 1 means that at least one long-term reference picture is used for prediction of pictures of the current layer.

The case where the value of inter_layer_long_copy_flag is 1 means that the long-term reference picture set of the reference layer, referred to by the current layer, is used as the long-term reference picture set of the current layer. When the value of inter_layer_long_copy_flag is 0, the long-term reference picture set of the current layer is derived by decoding the slice header of the current layer, not the reference layer.

When the value of inter_layer_long_copy_flag is 0, and the value of long_term_ref_pics_present_flag is 1, num_long_term_ref_pic_sps indicating the number of long-term reference pictures included in the SPS is signaled.

'lt_ref_pic_poc_lsb_sps[i]' denotes MaxPocLsb of an i-th candidate long-term reference picture specified in the SPS.

The case where used_by_curr_pic_lt_sps_flag[i] is 0 means that an i-th candidate long-term reference picture specified in the SPS is not used as the reference picture of a picture for which the i-th candidate long-term reference picture is included in the corresponding long-term reference picture set.

In summary, in an accordance with an embodiment of the present invention, when the reference layer referred to by the current layer is the base layer, the short-term reference picture set and the long-term reference picture set of the base layer may be used without change when the reference picture list of the current layer is constructed. In this case, in order to signal such information, the SPS may include flag information such as inter_layer_short_copy_flag or inter_layer_long_copy_flag.

That is, according to the present embodiment, a copy flag of each of the short-term reference picture set and the long-term reference picture set, rather than copy information (copy flag) of all reference picture sets of the current layer, may be signaled.

According to another embodiment, the current layer may use the inter-layer reference picture set of the reference layer as the inter-layer reference picture set of the current layer, wherein flag information indicating whether the inter-layer reference picture set is copied may be signaled.

The above-described flag information may be either signaled, with the information being included in the sequence parameter set, as shown in Tables 1 and 2, or transmitted, with the information being included in a video parameter set, a picture level, or a slice level.

Meanwhile, when the current layer refers to the inter-layer reference picture set information of the reference layer, information about the position, to which each inter-layer reference picture is to be added, in a reference picture list may be referred to. When the reference picture set of the current layer is added to the reference picture list, the position information of the reference layer may be used. The method for adding inter-layer reference pictures to the reference picture list has been described with reference to FIGS. 6 to 13.

Figure 14:
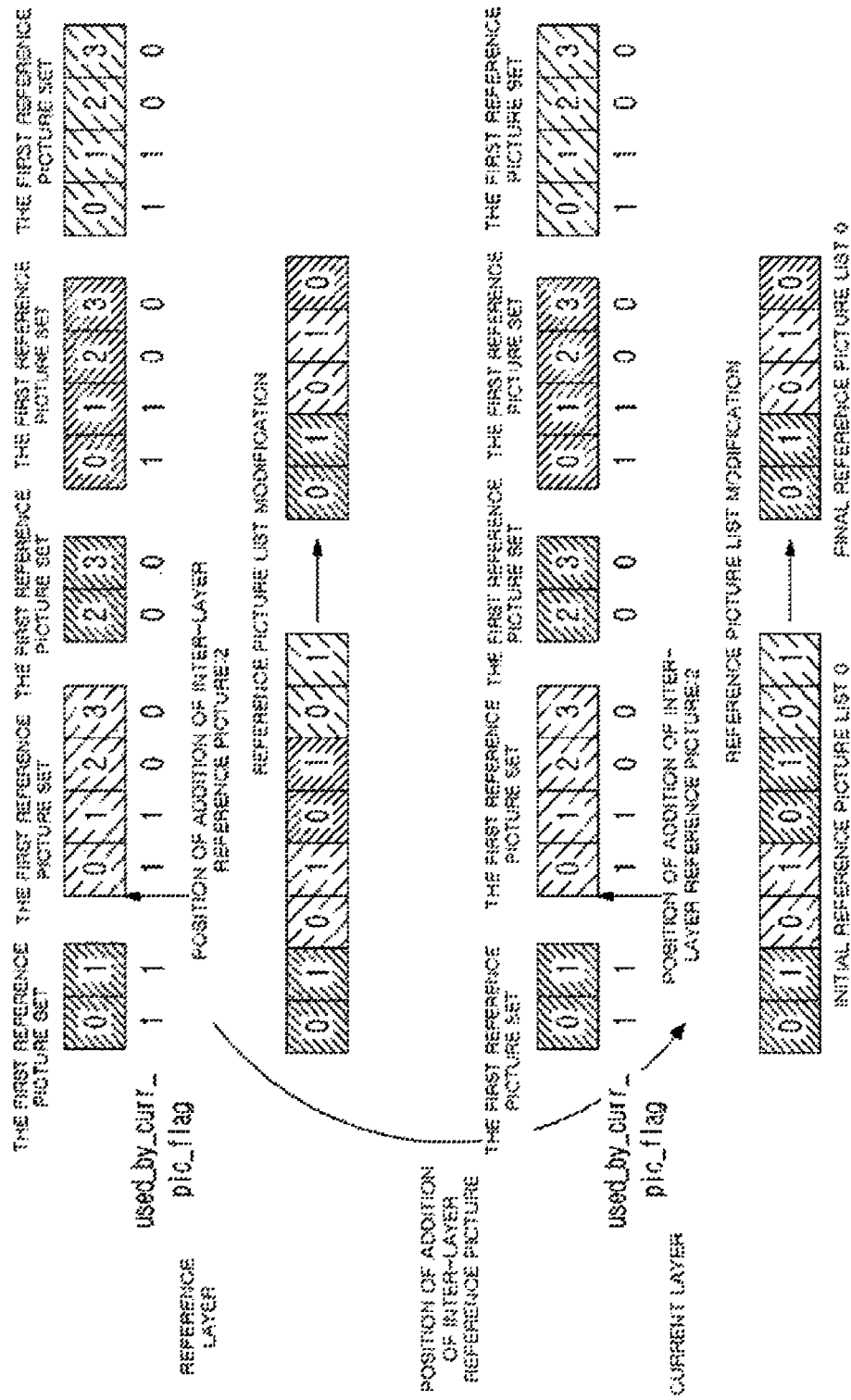
FIG. 14 is a diagram showing an example for referring to the position to which the inter-layer reference picture set of a reference layer is added according to an embodiment of the present invention.

FIG. 14 is a diagram showing an example for referring to the position to which the inter-layer reference picture set of the reference layer is added according to an embodiment of the present invention.

When a reference layer is not a base layer and is also encoded or decoded by referring to another layer, a sequential position to which the inter-layer reference picture of the reference layer is to be added in an initial reference picture list or at a specific position to which the inter-layer reference picture is to be added in the reference picture list may be used without change when the current layer is encoded or decoded.

As shown in FIG. 14, in the case of a reference layer, a fourth reference picture set composed of inter-layer reference pictures may be added to the position subsequent to picture 0 and picture 1 constituting a first reference picture set when being added to an initial reference picture list. That is, the inter-layer reference pictures may be aligned at the sequential position corresponding to the second reference picture set of the initial reference picture list.

Subsequent to the inter-layer reference picture set, picture 0 and picture 1 constituting a second reference picture set and picture 0 and picture 1 constituting a third reference picture set are aligned, wherein the value of 'used_by_curr_pic_s0_flag' in the pictures is 1.

The finally modified initial reference picture list is constructed using the pictures 0 and 1 of the first reference picture set, pictures 0 and 1 of the fourth reference picture set, and picture 0 of the second reference picture set.

As shown in the drawing, even in the initial reference picture list of the current layer, the inter-layer reference pictures may be aligned at the second sequential position, that is, subsequent to the first reference picture set.

If the position information of the reference layer is used when the initial reference picture list of the current layer is constructed, such position information may be signaled as flag information indicating whether the position of the inter-layer reference picture set of the reference layer has been merged. Further, the ID of the reference layer, the position information of which has been merged, may be additionally signaled.

When the positions to which inter-layer reference pictures are to be added are specified, the method for signaling the positions may also include multiple methods. The encoding device may encode the position information about the position, to which inter-layer reference picture set is to be added, in an initial reference picture list by including the position information in the slice or sequence level, for example, a slice header or sequence header. In the case of a bitstream supporting multiple view layers such as for multiview scalability, there may occur multiple cases where picture characteristics for respective layers are different from each other, and correlations with a reconstructed picture of the base layer are different from each other. Further, temporalId values for respective multiple layers may differ, and the frequencies at which inter-layer reference occurs according to the temporalId value may differ.

Depending on various conditions, the optimal positions to which inter-layer reference pictures are to be added for respective layers may differ, and thus the positions to which inter-layer reference pictures are to be added for respective multiple layers may be signaled.

Alternatively, in order to reduce a computational load in an encoding stage while maintaining variety of pictures in respective multiple layers, the encoding device may limit the number of positions to which reference pictures are to be added to a predetermined number, may set the positions to which inter-layer reference pictures can be added to correspond to the predetermined number, and may calculate bit rate distortion only for the set positions. Based on the calculated bit rate distortion, the optimal positions to which the inter-layer reference pictures can be added may be derived, and the encoding device may transmit information about such positions to the decoding device.

For example, the positions may be set such that the inter-layer reference pictures can be added to three positions, such as the first (foremost) position of an initial reference picture list, the position subsequent to a short-term reference picture set, and the position subsequent to a long-term reference picture set. In this case, the encoding device may encode the indication index of the position to which the inter-layer reference pictures are to be added, among the three positions, and may signal the encoded index.

Figure 15:
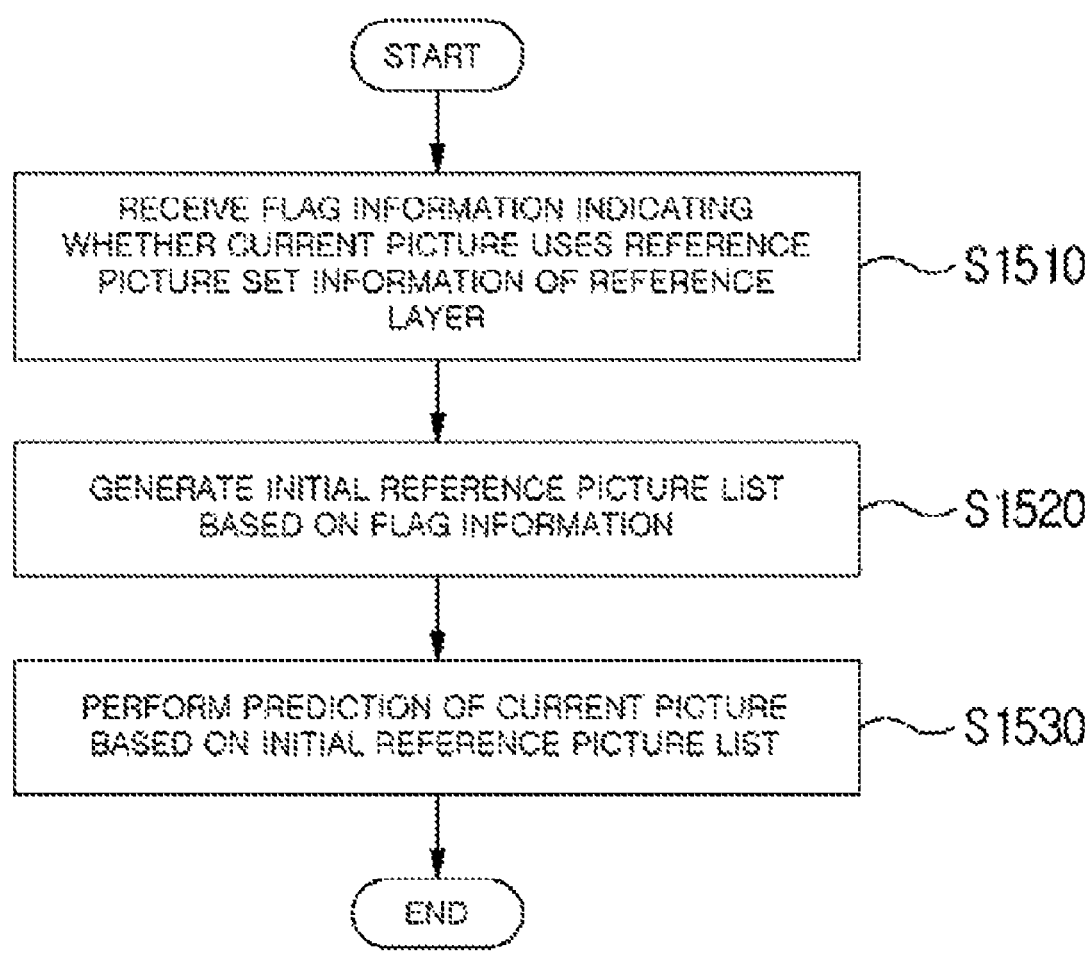
FIG. 15 is a control flowchart showing a video decoding method according to the present invention.

FIG. 15 is a control flowchart showing a method for generating a reference picture list according to the present invention.

First, the decoding device receives flag information indicating whether a current picture uses information about a reference picture set of a reference layer (S1510).

Such flag information may be flag information indicating whether the short-term reference picture set and the long-term reference picture set of the reference layer are derived as the short-term reference picture set and the long-term reference picture set of the current picture.

Alternatively, the flag information may be information indicating whether only the short-term reference picture set of the reference layer is derived as the short-term reference picture set of the current picture, and information indicating whether only the long-term reference picture set of the reference layer is derived as the long-term reference picture set of the current picture.

In this way, when flag information indicates whether any one of the short-term reference picture set and the long-term reference picture set of the reference layer is used or whether both of the short-term reference picture set and the long-term reference picture set are used for the initial reference picture list of a current picture without change, the reference layer may be a base layer that does not refer to inter-layer reference pictures.

If the reference layer is not a base layer, flag information may indicate whether the inter-layer reference picture set of the reference layer is derived as the inter-layer reference picture set of the current picture. That is, pictures of another layer referred to by the reference layer may also be referred to by the current picture, without change.

Alternatively, as shown in FIG. 13, flag information may indicate whether the position to which the inter-layer reference picture set of the reference layer is to be added in an initial reference picture list is used as the position to which the inter-layer reference picture set of the current picture is to be added in the initial reference picture list.

In accordance with another embodiment of the present invention, information about the position to which the inter-layer reference picture set of the reference layer is to be added in the initial reference picture list may be signaled as information about the difference between the indices of positions to which inter-layer reference picture sets are to be added in the initial reference picture list, that is, as a predicted value, rather than as the flag information. For example, when the position to which the inter-layer reference picture set of the reference layer is to be added in the initial reference picture list is a first sequential position, and the position to which the inter-layer reference picture set of the current layer is to be added in the initial reference picture list is a second sequential position, the encoding device may encode information about the difference between the first and second positions and may transmit the encoded information.

The decoding device may derive the position to which the inter-layer reference picture set of the current layer is to be added in the initial reference picture list, using the signaled difference information.

Such flag information may be signaled, with the flag information being included in a video level, a sequence level, a picture level, or a slice level.

Next, the decoding device generates a reference picture list based on the flag information (S1520).

When the above-described flag information, indicating whether the reference picture set information of the reference layer is used, is 1, the reference picture set of the reference layer may be used without change when the initial reference picture list of the current picture is constructed.

When the flag information is 0, the initial reference picture list of the current picture is independently constructed without using the information of the reference layer.

The prediction unit may modify the initial reference picture list based on additional information about the modification of the reference picture list.

The prediction unit may perform prediction of the current picture based on the initial reference picture list or modified final reference picture list (S1530).

When the current picture is predicted, the reference pictures included in the inter-layer reference picture set are represented by long-term reference pictures, and the decoding device may use the reference pictures included in the inter-layer reference picture set as the reference pictures of the current picture.

In the above-described exemplary systems, although methods have been described based on flowcharts as a series of steps or blocks, the present invention is not limited to a specific sequence of steps, wherein some steps may be performed in a sequence differing from that of the above-described steps, or simultaneously with the steps. Further, since the above-described embodiments include various aspects of examples, it should be understood that combinations of the embodiments also correspond to embodiments of the present invention. Therefore, it is apparent that the present invention may include all substitutions, modifications and changes belonging to the scope of the accompanying claims of the invention.

INDUSTRIAL APPLICABILITY

The present invention may be used to code a video signal having a multi-layer structure.

The invention claimed is:

1. A method for decoding a video supporting multiple layers with a decoding apparatus, comprising:

generating, with the decoding apparatus, an initial reference picture list relating to a current picture; and performing, with the decoding apparatus, prediction of the current picture based on the initial reference picture list, wherein the initial reference picture list includes a reference picture list 0 and a reference picture list 1, wherein each of the reference picture list 0 and the reference picture list 1 includes a short-term reference picture set, a long-term reference picture set, and an inter-layer reference picture set, wherein the inter-layer reference picture set includes a first sub-reference layer picture set and a second sub-reference layer picture set, wherein the reference picture list 0 is constructed by arranging the first sub-reference layer picture set between a first short-term reference picture set having POCs less than POCs of the current picture and a second short-term reference picture set having POCs greater than POCs of the current picture and arranging the second sub-reference layer picture set at the end of the long-term reference picture set, wherein the long-term reference picture set, the first short-term reference picture set and the second reference picture set belong to a current layer including the current picture, and wherein the first and the second sub-reference layer picture sets belong to a different layer from the current layer.

2. The method of claim 1, further comprising generating, with the decoding apparatus, a final reference picture list by modifying the initial reference picture list.

3. The method of claim 1, wherein performing prediction of the current picture is configured to use a reference picture, included in an inter-layer reference picture set, as a reference picture of the current picture.

4. The method of claim 1, wherein the reference picture list 1 is constructed different from the reference picture list 0 in terms of each position of the first and second sub-reference layer picture sets.

5. The method of claim 1, wherein the reference picture list 1 is constructed by arranging the second sub-reference layer picture set between the second short-term reference picture set and the first short-term reference picture set, and arranging the first sub-reference layer picture set at the end of the long-term reference picture set.

\* \* \* \* \*